US011623261B2

(12) United States Patent
Otsuka

(10) Patent No.: US 11,623,261 B2
(45) Date of Patent: Apr. 11, 2023

(54) HOT-STAMPING FORMED ARTICLE, VEHICLE MEMBER, AND MANUFACTURING METHOD OF HOT-STAMPING FORMED ARTICLE

(71) Applicant: NIPPON STEEL & SUMITOMO METAL CORPORATION, Tokyo (JP)

(72) Inventor: Kenichiro Otsuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 688 days.

(21) Appl. No.: 16/316,163

(22) PCT Filed: Jul. 13, 2017

(86) PCT No.: PCT/JP2017/025545
§ 371 (c)(1),
(2) Date: Jan. 8, 2019

(87) PCT Pub. No.: WO2018/012588
PCT Pub. Date: Jan. 18, 2018

(65) Prior Publication Data
US 2020/0376534 A1    Dec. 3, 2020

(30) Foreign Application Priority Data

Jul. 13, 2016  (JP) .............................. JP2016-138962
Apr. 10, 2017  (JP) .............................. JP2017-077432

(51) Int. Cl.
*B21D 22/02*    (2006.01)
*B21D 53/88*    (2006.01)
(Continued)

(52) U.S. Cl.
CPC ........... *B21D 22/022* (2013.01); *B21D 53/88* (2013.01); *B62D 25/025* (2013.01); *B62D 25/04* (2013.01); *B62D 25/06* (2013.01)

(58) Field of Classification Search
CPC ........ B21D 22/06; B21D 53/88; B21D 37/08; B21J 13/025
See application file for complete search history.

(56) References Cited

U.S. PATENT DOCUMENTS 1,927,442 A      9/1933   Laufle
5,600,931 A  *   2/1997   Jonsson  ............. E01F 15/0407
                                                          52/833
(Continued)

FOREIGN PATENT DOCUMENTS

CN         2447080 Y      9/2001
CN         2741690 Y      11/2005
(Continued)

OTHER PUBLICATIONS

JPH09249155A Machine Translation (Year: 2003).*
(Continued)

*Primary Examiner* — Michael W Hotchkiss
(74) *Attorney, Agent, or Firm* — Birch, Stewart, Kolasch & Birch, LLP

(57) ABSTRACT

A hot-stamping formed article is formed of a single steel sheet, and includes: a top sheet portion; a pair of standing wall portions; and a protrusion portion which connects the top sheet portion to the standing wall portion and protrudes outward from the top sheet portion, in which the protrusion portion includes an inner wall portion which stands upright from the top sheet portion, and an outer wall portion which is folded outward from an end edge of the inner wall portion, and an angle between the top sheet portion and the protrusion portion is 80° to 90°.

11 Claims, 25 Drawing Sheets

(51) Int. Cl.
  B62D 25/02    (2006.01)
  B62D 25/04    (2006.01)
  B62D 25/06    (2006.01)

(56) References Cited

U.S. PATENT DOCUMENTS

| | | | | |
|---|---|---|---|---|
| 6,503,639 | B1* | 1/2003 | Iwaya | B21D 25/02 |
| | | | | 428/167 |
| 6,509,541 | B2* | 1/2003 | Jung | B29C 53/04 |
| | | | | 219/91.2 |
| 9,211,858 | B2* | 12/2015 | Johnson | B21D 53/88 |
| 9,669,686 | B2* | 6/2017 | Brockhoff | B60J 5/0444 |
| 10,035,324 | B2* | 7/2018 | Yasuyama | B32B 3/02 |
| 10,081,043 | B2* | 9/2018 | Flehmig | B21D 41/00 |
| 10,167,530 | B2* | 1/2019 | Nakagaito | C21D 8/0221 |
| 10,213,819 | B2* | 2/2019 | Ito | B21D 22/20 |
| 10,265,753 | B2* | 4/2019 | Yuasa | B21D 22/022 |
| 10,300,519 | B2* | 5/2019 | Sakamoto | B21D 22/06 |
| 10,479,429 | B2* | 11/2019 | Kamiya | B60R 19/04 |
| 2010/0096765 | A1 | 4/2010 | Kuwayama et al. | |
| 2011/0016945 | A1* | 1/2011 | Nakao | B21D 22/06 |
| | | | | 72/358 |
| 2012/0067098 | A1* | 3/2012 | Chien | B21D 22/22 |
| | | | | 72/294 |
| 2012/0285098 | A1* | 11/2012 | Rakei | B60J 5/0444 |
| | | | | 49/501 |
| 2013/0104618 | A1* | 5/2013 | Daimaru | B21D 22/00 |
| | | | | 72/362 |
| 2013/0316132 | A1 | 11/2013 | Yuasa | |
| 2015/0007911 | A1* | 1/2015 | Murakami | C22C 38/02 |
| | | | | 148/507 |
| 2015/0224563 | A1 | 8/2015 | Aso et al. | |
| 2015/0354035 | A1* | 12/2015 | Mizuta | C22C 38/00 |
| | | | | 148/504 |
| 2016/0067757 | A1 | 3/2016 | Flehmig et al. | |
| 2016/0263637 | A1 | 9/2016 | Yoshikawa et al. | |
| 2017/0266706 | A1* | 9/2017 | Ito | B21D 22/26 |
| 2017/0291476 | A1* | 10/2017 | Schneider | B60J 5/0461 |
| 2017/0306437 | A1* | 10/2017 | Nakagawa | C22C 38/08 |
| 2019/0119768 | A1* | 4/2019 | Schleichert | C21D 1/34 |
| 2019/0241988 | A1* | 8/2019 | Murakami | C22C 38/00 |

FOREIGN PATENT DOCUMENTS

| | | | |
|---|---|---|---|
| CN | 101678430 | A | 3/2010 |
| CN | 101850387 | A | 10/2010 |
| CN | 102357612 | A | 2/2012 |
| CN | 103447379 | A | 12/2013 |
| DE | 19756459 | A1 | 6/1999 |
| JP | 59-60019 | U | 4/1984 |
| JP | 61-157427 | A | 7/1986 |
| JP | 9-249155 | A | 9/1997 |
| JP | H09249155 | A * | 9/2003 |
| JP | 2005-152969 | A | 6/2005 |
| JP | 2008-155749 | A | 7/2008 |
| JP | 2008189311 | A * | 8/2008 |
| JP | 2008-265609 | A | 11/2008 |
| JP | 2010-242168 | A | 10/2010 |
| JP | 2011-67841 | A | 4/2011 |
| JP | 2011-83807 | A | 4/2011 |
| JP | 2011067841 | A * | 4/2011 |
| JP | 2012-121377 | A | 6/2012 |
| JP | 2012121377 | A * | 6/2012 |
| JP | 2013-27894 | A | 2/2013 |
| JP | 2013027894 | A * | 2/2013 |
| JP | 2013-185246 | A | 9/2013 |
| JP | 2016-124029 | A | 7/2016 |
| RU | 2 124 408 | C1 | 1/1999 |
| RU | 2 399 449 | C2 | 9/2010 |
| SU | 1755995 | A1 | 8/1992 |
| WO | 2014/166839 | A1 | 10/2014 |
| WO | WO 2015/083812 | A1 | 6/2015 |
| WO | WO 2016/063467 | A1 | 4/2016 |

OTHER PUBLICATIONS

JP-2013027894-A Machine Translation (Year: 2013).*
JP-2011067841-A Machine Translation (Year: 2011).*
JP-2008189311-A Machine Translation (Year: 2008).*
JP-2012121377-A Machine Translation (Year: 2012).*
"Vickers hardness test—Test Method", JIS Z 2244, 2009, total 98 pages.
International Search Report for PCT/JP2017/025545 dated Oct. 3, 2017.
Office Action for JP 2017-562792 dated Jul. 17, 2018.
Written Opinion of the International Searching Authority for PCT/JP2017/025545 (PCT/ISA/237) dated Oct. 3, 2017.
Russian Office Action and Search Report dated Oct. 3, 2019, for Russian Application No. 2019101812, with English translation.
Chinese Office Action and Search Report for counterpart Chinese Application No. 201780042697.0, dated Nov. 1, 2019, with partial English translation.
Extended European Search Report, dated Feb. 19, 2020, for European Application No. 17827711.7.

* cited by examiner

SAMPLE 1

SAMPLE 3

# HOT-STAMPING FORMED ARTICLE, VEHICLE MEMBER, AND MANUFACTURING METHOD OF HOT-STAMPING FORMED ARTICLE

TECHNICAL FIELD OF THE INVENTION

The present invention relates to a hot-stamping formed article, a vehicle member, and a manufacturing method of a hot-stamping formed article.

Priority is claimed on Japanese Patent Application No. 2016-138962, filed on Jul. 13, 2016, and Japanese Patent Application No. 2017-077432, filed on Apr. 10, 2017, the contents of which are incorporated herein by reference.

RELATED ART

Structural members (particularly long vehicle members) of vehicles are required to have high characteristics in a three-point bending test in order to improve collision safety performance. In response to this request, various proposals have hitherto been made.

For example, Patent Document 1 discloses an impact absorbing member including a portion in which a steel sheet is folded in a triple structure and a manufacturing method thereof for the purpose of enhancing bending collapse characteristics. Patent Document 2 discloses an impact absorbing member including a portion in which a steel sheet is folded in a triple structure and a manufacturing method thereof for the purpose of enhancing axial crushing characteristics.

In addition, Patent Document 3 discloses a frame component having a reinforcing portion formed at a connection portion between a top wall portion and a standing wall portion and a manufacturing method thereof for the purpose of primarily enhancing bending rigidity. The reinforcing portion is formed of an overlapping portion rounded in a cylindrical shape.

PRIOR ART DOCUMENT

Patent Document

[Patent Document 1] Japanese Unexamined Patent Application, First Publication No. 2008-265609
[Patent Document 2] Japanese Unexamined Patent Application, First Publication No. 2008-155749
[Patent Document 3] Japanese Unexamined Patent Application, First Publication No. 2013-27894

DISCLOSURE OF THE INVENTION

Problems to be Solved by the Invention

In recent years, due to a reduction in the weight of a vehicle and the like, high-strengthening (high tensile strength) is required for a structural member of a vehicle (hereinafter, also referred to as vehicle member). In addition, a steel sheet having a high tensile strength (hereinafter, also referred to as high tensile strength steel sheet (high tensile material)) is used for the vehicle member. In addition, further enhancement of collision safety performance is required for the vehicle member. In other words, a press-formed article having high strength and high characteristics in a three-point bending test is required.

On the other hand, since a high tensile strength steel sheet generally has low ductility, forming defects such as cracks are likely to be generated during press working.

In a case where a high tensile strength steel sheet (for example, a steel sheet having a tensile strength of 780 MPa or more) is subjected to press working using the methods disclosed in Patent Documents 1 to 3, there is concern that forming defects such as cracks may be generated in an overlapping portion having significant deformation. Therefore, in the methods disclosed in Patent Documents 1 to 3, it is difficult to manufacture a press-formed article having a high tensile strength and high characteristics in a three-point bending test.

The present invention has been made taking the foregoing circumstances into consideration, and an object thereof is to provide a hot-stamping formed article capable of having high tensile strength and improved characteristics in a three-point bending test, a vehicle member, and a manufacturing method of a hot-stamping formed article.

Means for Solving the Problem

In order to solve the above problem, the present invention employs the following.

(1) According to a first aspect of the present invention, a hot-stamping formed article formed article formed of a single steel sheet, includes: a top sheet portion; a pair of standing wall portions; and a protrusion portion which connects the top sheet portion to the standing wall portion and protrudes outward from the top sheet portion, in which the protrusion portion includes an inner wall portion which stands upright from the top sheet portion, and an outer wall portion which is folded outward from an end edge of the inner wall portion, and an angle between the top sheet portion and the protrusion portion is 80° to 90°.

(2) In the aspect according to (1), the inner wall portion and the outer wall portion of the protrusion portion may abut each other.

(3) In the aspect according to (1), the inner wall portion and the outer wall portion of the protrusion portion may be joined to each other.

(4) In the aspect according to any one of (1) to (3), a protruding length of the protrusion portion may be 3 mm or more.

(5) In the aspect according to any one of (1) to (4), a pair of flange portions which are connected to end portions of the pair of standing wall portions and extend so as to be separated from each other may be further included.

(6) According to a second aspect of the present invention, a vehicle member includes: the hot-stamping formed article according to any one of (1) to (5); and a steel sheet member which is joined to the hot-stamping formed article so as to form a closed cross section with the hot-stamping formed article.

(7) In the aspect according to (6), a patch member joined to at least one of an inner surface of the top sheet portion and an inner surface of the standing wall portion may be further included.

(8) According to a third aspect of the present invention, a manufacturing method of the hot-stamping formed article according to any one of (1) to (5), includes: a preparation step of obtaining a preliminary formed article, in which a recessed part is formed, by pressing a base steel sheet; a heating step of heating the preliminary formed article; and a press-forming step of forming the preliminary formed article into the hot-stamping formed article by performing press working on the heated preliminary formed article, in which, in the press-forming step, a pressing apparatus including a lower die having a protrusion, an upper die which has a punch portion that presses the preliminary formed article and is movable in a vertical direction toward the lower die, and a pair of slide dies which cause the protrusion to be interposed between the slide dies and are movable in a horizontal direction toward side surfaces of the protrusion is used, the preliminary formed article is placed in the pressing apparatus so as to cause the protrusion of the lower die to protrude in the recessed part of the preliminary formed article and not to be brought into contact with the protrusion, the punch portion, and the pair of slide dies, and the preliminary formed article is pressed by moving the punch portion and the pair of slide dies.

(9) In the aspect according to (8), the following configuration may be provided: the upper die of the pressing apparatus further includes slide pressing dies which are disposed to face the slide dies and press the slide dies, and in the press-forming step, by moving the slide pressing dies toward the lower die, the slide dies come into sliding contact with the slide pressing dies, and the preliminary formed article is pressed.

(10) In the aspect according to (8) or (9), pressing by the slide dies may be completed after pressing by the punch portion is completed.

(11) According to a fourth aspect of the present invention, a manufacturing method of the hot-stamping formed article according to (5), the hot-stamping formed article being manufactured by using a pressing apparatus including a lower die having a protrusion and a pair of movable plates that cause the protrusion to be interposed between the movable plates and are movable in a vertical direction, a punch die which is movable in the vertical direction toward the protrusion, and a pair of movable dies which cause the punch die to be interposed between the movable dies and are movable toward the movable plates and the protrusion, includes: a step of heating a base steel sheet; a step of placing the heated base steel sheet on the pair of movable plates so as not to be brought into contact with the protrusion; a step of forming the base steel sheet into a deformed steel sheet having a recessed part by lowering the pair of movable dies while abutting the base steel sheet; a step of pressing the deformed steel sheet by moving the punch die toward the protrusion; and a step of pressing the deformed steel sheet by moving the pair of movable dies toward the punch die.

Effects of the Invention

According to each of the aspects of the present invention, it is possible to provide the hot-stamping formed article having high tensile strength and improved characteristics in a three-point bending test, the vehicle member, and the manufacturing method of a hot-stamping formed article.

EMBODIMENTS OF THE INVENTION

Hereinafter, embodiments of the present invention and modification examples thereof will be described in detail with reference to the drawings. In the specification and the drawings, like constituent elements having substantially the same functional configuration are denoted by like element numerals, and overlapping descriptions will be omitted.

First Embodiment

[Hot-Stamping Formed Article (Press-Formed Article)]

First, a hot-stamping formed article according to a first embodiment of the present invention will be described. In the following description, there may be cases where the hot-stamping formed article is referred to as "press-formed article". In addition, in the specification, there may be cases where the region surrounded by a pair of two standing wall portions, a virtual plane connecting the end portions of the pair of standing wall portions, and a top sheet portion is referred to as "the inside of the press-formed article", and the region on the side opposite to the inside with the standing wall portions and the top sheet portion interposed therebetween is referred to as "the outside of the press-formed article".

Figure 1:
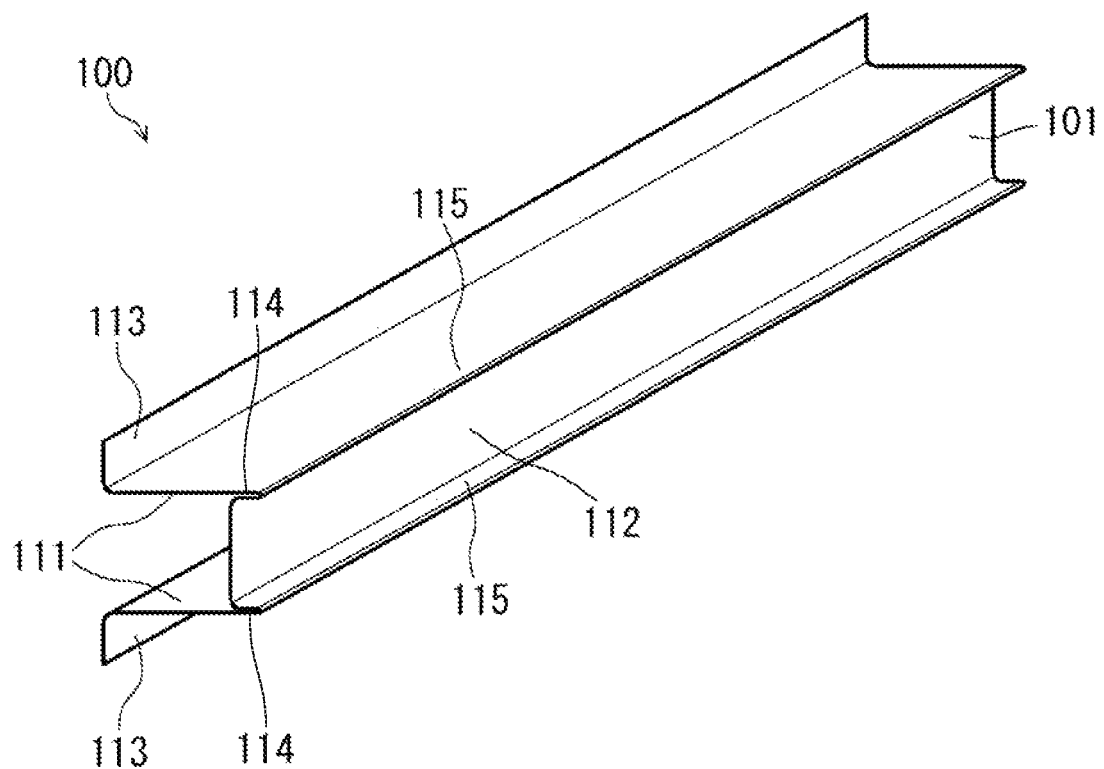
FIG. 1 is a perspective view showing a press-formed article (hot-stamping formed article) according to a first embodiment of the present invention.
Figure 2:
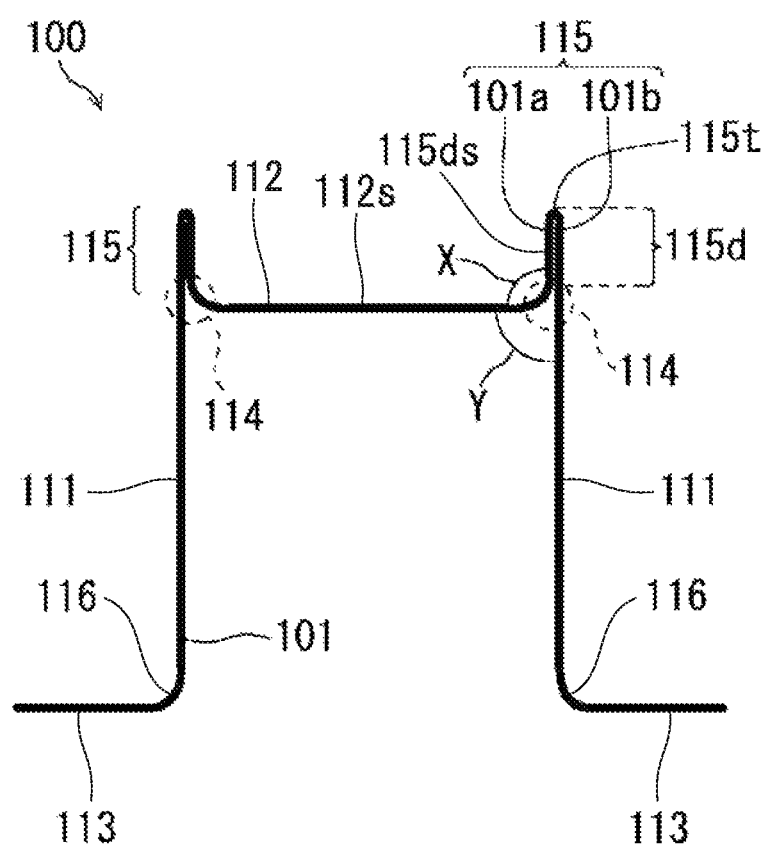
FIG. 2 is a view showing the press-formed article, and is a cross-sectional view (transverse sectional view) when viewed in a cross section perpendicular to a longitudinal direction.

FIGS. 1 and 2 are views showing a press-formed article 100 (hot-stamping formed article) according to the first embodiment of the present invention. FIG. 1 is a perspective view, and FIG. 2 is a cross-sectional view (transverse sectional view) when viewed in a cross section perpendicular to a longitudinal direction. Hereinafter, the upper side (top sheet portion side) in FIG. 2 is referred to as the upper side (outer side) of the press-formed article 100, and the lower side (flange portion side) in FIG. 2 is referred to as the lower side (inner side) of the press-formed article 100 (P) in some cases.

The press-formed article 100 is formed of a single steel sheet 101 which is long in one direction, and is manufactured from a single base steel sheet (blank) by hot stamping. The tensile strength of the press-formed article 100 is, for example, 590 MPa or more, but may be 780 MPa or more, 980 MPa or more, 1500 MPa or more, or 1800 MPa or more. The upper limit of the tensile strength of the press-formed article 100 is not particularly limited, but is, for example, 2500 MPa or less. Since hot stamping is used for manufacturing the press-formed article 100, the tensile strength of the press-formed article 100 can be made higher than the tensile strength of the base steel sheet as a material.

Here, the base steel sheet (blank) is a flat plate-shaped steel sheet and has a planar shape corresponding to the shape of the press-formed article to be manufactured. The thickness and physical properties of the base steel sheet are selected according to the characteristics required for the press-formed article 100. For example, in a case where the press-formed article 100 is a structural member of a vehicle (vehicle member), a base steel sheet corresponding thereto is selected. The thickness of the base steel sheet may be, for example, 0.4 mm to 4.0 mm, and may be 0.8 mm to 2.0 mm.

The press-formed article 100 can be used in a structural member of various moving units (vehicles, two-wheeled motor vehicles, railway vehicles, ships, and airplanes) or a structural member of various machines. Examples of the structural member of a vehicle include a side sill, a pillar (a front pillar, a lower front pillar, a center pillar, and the like), a roof rail, a roof arch, a bumper, a beltline reinforcement, and a door impact beam.

As shown in FIG. 1 and FIG. 2, the press-formed article 100 includes a top sheet portion 112, a pair of standing wall portions 111 which are parallel to each other, a pair of protrusion portions 115 which connect the top sheet portion 112 to the pair of standing wall portions 111 and protrude upward (outward) from the top sheet portion 112, and a pair of flange portions 113 which are respectively connected to the pair of standing wall portion 111 so as to be separated from each other.

Each of the standing wall portions 111, the top sheet portion 112, and each of the flange portions 113 have a flat plate shape. The top sheet portion 112 is perpendicular to the pair of standing wall portions 111 and causes the pair of standing wall portions 111 to be connected via the pair of protrusion portions 115. As shown in FIG. 2, the flange portions 113 extend from the lower end portions of the standing wall portions 111 in a direction perpendicular to the standing wall portions 111 and outward in a width direction. That is, the flange portions 113 are outwardly-extending flanges and are parallel to the top sheet portion 112.

The cross-sectional shapes of the pair of protrusion portions 115 have line symmetry when viewed in a cross section perpendicular to the longitudinal direction. The protrusion portion 115 protrudes upward perpendicularly to the top sheet portion 112 from a boundary portion 114 (a position where a plane including the standing wall portion 111 and a plane including the top sheet portion 112 intersect) which connects the standing wall portion 111 and the top sheet portion 112. The protrusion portion 115 includes an inner wall portion 101a that stands upright continuously from an outer surface 112s (a surface facing outward among a pair of surfaces opposed to each other in the sheet thickness direction of the top sheet portion 112) of the top sheet portion 112 and an outer wall portion 101b which is folded outward of the inner wall portion 101a (outward in the width direction of the press-formed article 100) from a tip end 115t (end edge) of the inner wall portion 101a and is connected to the standing wall portion 111. That is, the protrusion portion 115 has a double wall structure.

In the protrusion portion 115, the outer surface of the inner wall portion 101a and the inner surface of the outer wall portion 101b abut each other. That is, as the inner wall portion 101a and the outer wall portion 101b abut each other, they overlap and form an overlapping portion 115d.

The overlapping portion 115d has a flat plate shape as a whole. In addition, the transverse section (a cross section perpendicular to the longitudinal direction) of the press-formed article 100 excluding the protrusion portion 115 is hat-shaped.

Here, the ratio (MHv/WHv) of the Vickers hardness MHv of the protrusion portion 115 to the Vickers hardness WHv of the standing wall portion 111 may be 0.95 or more.

As shown in FIG. 2, the angle between the top sheet portion 112 and the protrusion portion 115 is referred to as an angle X. Specifically, the angle X means the angle between a plane including the outer surface 112s of the top sheet portion 112 and a plane including a surface 115ds (the inner surface of the inner wall portion 101a in the overlapping portion 115d) of the overlapping portion 115d. As shown in FIG. 2, in the press-formed article 100, the top sheet portion 112 and the overlapping portion 115d are perpendicular to each other, and the angle X is 90°. The angle X may be 80° to 90°, and is more preferably 85° to 90°.

In a case where a portion of the top sheet portion 112 is not in a flat plate shape due to the formation of fine convex and concave portions on the top sheet portion 112 or the like, the angle formed when the entire top sheet portion 112 is regarded as a flat plate is referred to as the angle X of the top sheet portion.

No stepped portion, curved portion, or the like is provided between the outer wall portion 101b extending from the standing wall portion 111 and the standing wall portion 111, and the outer wall portion 101b and the standing wall portion 111 are connected to constitute a single flat sheet. Accordingly, it is possible to prevent a load from being concentrated on the stepped portion or the curved portion at the time of a collision.

Figure 11A:
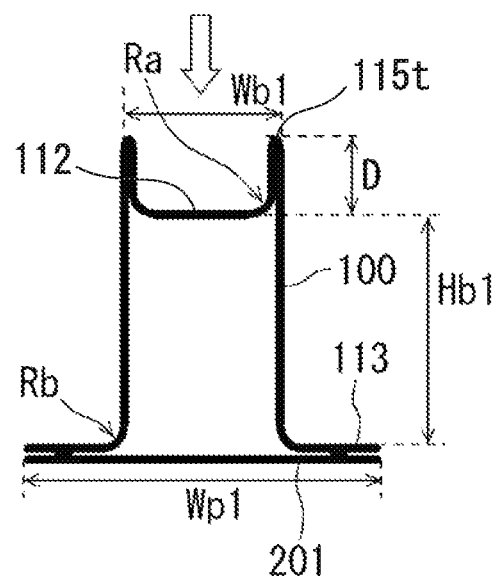
FIG. 11A is a transverse sectional view showing a sample 1 used in an example.

A protruding length D (the distance from the inner surface of the top sheet portion 112 to the tip end 115t of the protrusion portion 115: see FIG. 11A) of the protrusion portion 115 may be 3 mm or more, 5 mm or more, 10 mm or more, or 15 mm or more. The upper limit of the protruding length D is not particularly limited, but is, for example, 25 mm or less.

The protruding lengths D of the pair of protrusion portions 115 are equal to each other. The protruding lengths D of the pair of protrusion portions 115 may be different from each other. However, in this case, the difference between the two is preferably equal to or less than 10% of the protruding length D of the longer protrusion portion.

The length of the overlapping portion 115d (the distance from the lower end of the overlapping portion 115d to the tip end 115t) is equal to or less than 1 time the protruding length D, and for example, 0.1 to 1 times the protruding length D. The length of the overlapping portion 115 d may be 0.5 to 1 times the protruding length D, or may be 0.3 to 0.8 times.

As shown in FIG. 2, the overlapping portion 115d is not rounded in a cylindrical shape. That is, the cross-sectional shape of the overlapping portion 115d (the shape as viewed in a cross section perpendicular to the longitudinal direction) is linear. Furthermore, as described above, in the overlapping portion 115d, the inner wall portion 101a and outer wall portion 101b abut each other. In a region other than the tip end 115t, a portion of the steel sheet forming the protrusion portion 115 is curved but is not folded. That is, except for the tip end 115t, there is no ridge portion protruding outward of the protrusion portion 115 in the protrusion portion 115.

As shown in FIG. 2, the angle between the standing wall portion 111 and the top sheet portion 112 inside the press-formed article 100 is assumed to be Y(°). In addition, in the press-formed article 100, the angle Y is 90°. The angle Y may be less than 90°, or may be 90° to 150°. In addition, the angle Y between the top sheet portion 112 and one of the pair of standing wall portions 111 and the angle Y between the top sheet portion 112 and the other standing wall portion 111 preferably have a difference of 10° or less, and are more preferably the same.

As shown in FIG. 2, in the press-formed article 100, the standing wall portion 111 and the flange portion 113 are connected via an R portion 116 having a predetermined radius of curvature. Accordingly, it is possible to suppress the occurrence of buckling due to the concentration of a load on the boundary between the standing wall portion 111 and the flange portion 113.

Similarly, the top sheet portion 112 and the protrusion portion 115 are connected via an R portion. Accordingly, it is possible to suppress the occurrence of buckling due to the concentration of a load on the boundary between the top sheet portion 112 and the protrusion portion 115. The radius of curvature of the R portion is preferably 0.1 to 1 times the protruding length D, more preferably 0.2 to 0.8 times the protruding length D, and even more preferably 0.2 to 0.5 times the protruding length D.

The protrusion portion 115 may be formed only in a partial region in the longitudinal direction, and the protrusion portion 115 may not be formed in other regions (that is, not the entire press-formed article (100) in the longitudinal direction may have the protrusion portion 115 formed therein and the press-formed article 100 may have the protrusion portion 115 formed only partially in the longitudinal direction).

Figure 3A:
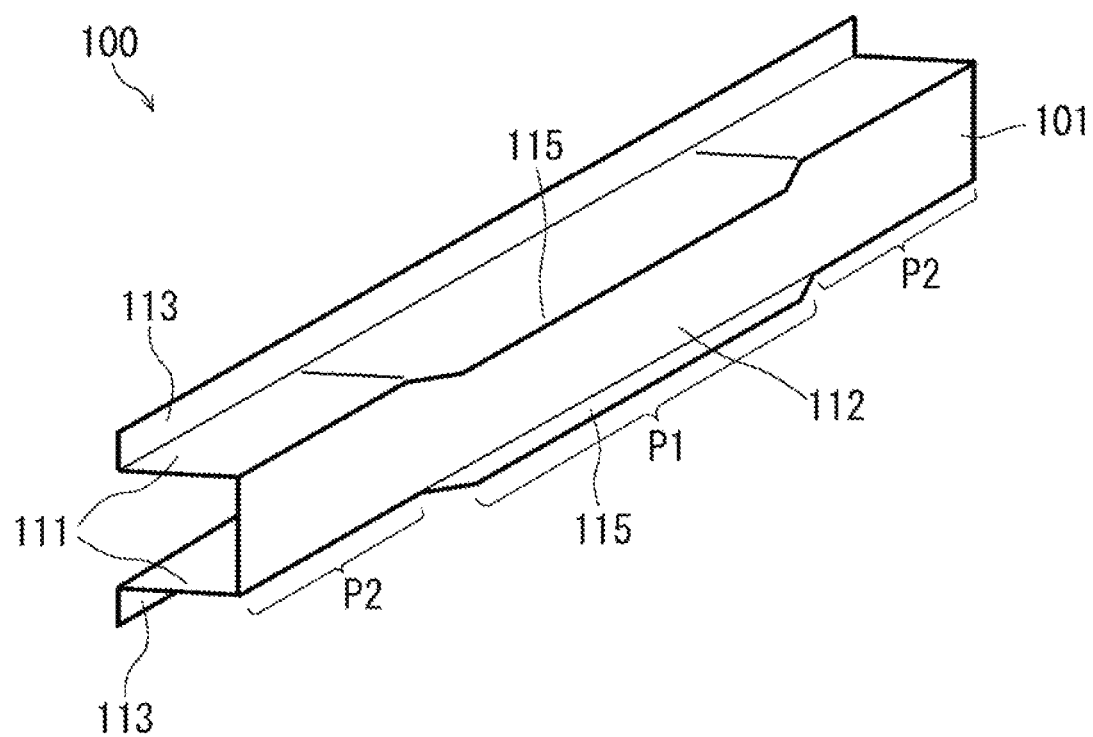
FIG. 3A is a perspective view showing a first modification example of the press-formed article.

A perspective view of an example of the press-formed article 100 which has the protrusion portion formed only partially in the longitudinal direction is shown in FIG. 3A. In the press-formed article 100 in FIG. 3A, the protrusion portion 115 is not formed in regions P2 at both ends in the longitudinal direction, and the protrusion portion 115 is formed in a central region P1 in the longitudinal direction. With such a configuration, in a case where the press-formed article 100 is combined with another member to form a structural member, it is possible to obtain desired collision safety performance without restrictions on the shape of the member.

Here, the press-formed article having the protrusion portion formed only partially in the longitudinal direction as shown in FIG. 3A can be manufactured by a manufacturing method according to the embodiment (a manufacturing method by two steps), which will be described later, and cannot be manufactured by a manufacturing method according to a second embodiment (a manufacturing method by a single step). The press-formed article as shown in FIG. 3A or 3B can be manufactured by joining a press-formed article with no protrusion portion to both ends of the press-formed article in the longitudinal direction, which has the protrusion portion 115 formed entirely in the longitudinal direction, by welding or the like (that is, the press-formed article as shown in FIG. 3A to 3B can be manufactured by joining a press-formed article with no protrusion portion to a press-formed article manufactured by the manufacturing method according to the second embodiment).

Figure 3B:
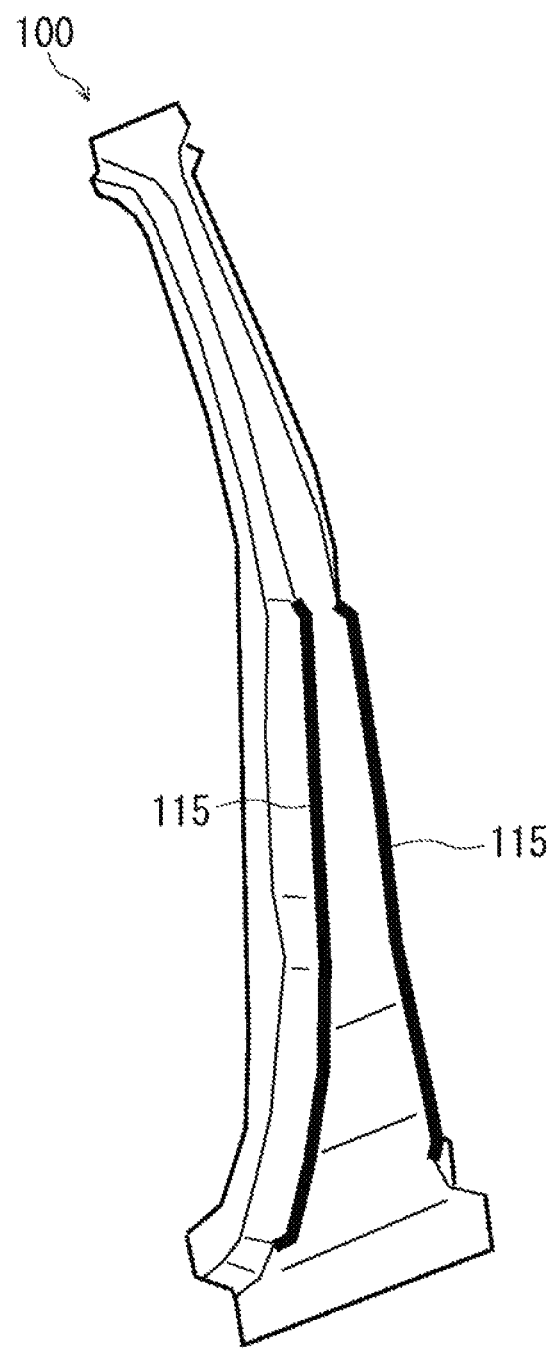
FIG. 3B is a perspective view showing a second modification example of the press-formed article.

A perspective view of an example of the press-formed article 100 which has a protrusion portion formed only partially in a longitudinal direction is schematically shown in FIG. 3B. The press-formed article 100 in FIG. 3B is an example of a center pillar. FIG. 3B is an example of a case where the press-formed article 100 is used as a center pillar, and the outer edges of the protrusion portions 115 are indicated by bold lines.

Figure 4:
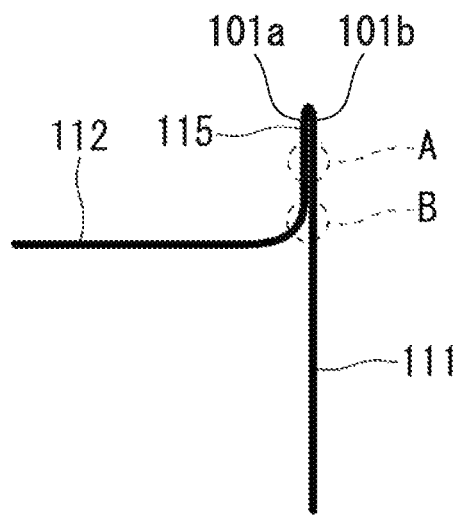
FIG. 4 is a view showing a third modification example of the press-formed article, and is a partial cross-sectional view when viewed in a cross section perpendicular to the longitudinal direction.

Furthermore, as shown in FIG. 4, the inner wall portion 101a and the outer wall portion 101b constituting the protrusion portion 115 may be joined to each other by welding. That is, in a region A corresponding to the overlapping portion 115d, the inner wall portion 101a and the outer wall portion 101b may be joined to each other by welding such as spot welding or laser welding. In addition, in a region B excluding the overlapping portion 115d, the inner wall portion 101a and the outer wall portion 101b may be joined to each other by arc welding (fillet welding).

The inner wall portion 101a and the outer wall portion 101b constituting the protrusion portion 115 are not limited to welding, and may be joined to each other, for example, by an adhesive, brazing, riveting, bolting, or friction stir welding.

According to the press-formed article 100 according to the embodiment described above, since the top sheet portion 112 and the standing wall portion 111 are connected via the protrusion portion 115 having a double wall structure, the rigidity of the press-formed article can be improved. Therefore, it is possible to reduce deformation of the press-formed article 100 when a load that causes three-point bending deformation is input to the press-formed article 100. That is, since the occurrence of buckling of the standing wall portion 111 can be suppressed in a three-point bending test, the characteristics in the three-point bending test (the amount of absorbed energy against three-point bending deformation) can be improved. In addition, as will be described later, a high strength press-formed article 100 formed of a steel sheet having a tensile strength of 590 MPa or more is achieved by hot stamping. Therefore, in the press-formed article 100 having high tensile strength, characteristics in the three-point bending test can be improved.

As described above, it is preferable that the inner wall portion 101a and the outer wall portion 101b of the protrusion portion 115 are joined to each other. In this case, when the load is input to the press-formed article 100, it is possible to prevent the inner wall portion 101a and the outer wall portion 101b from being separated from each other (deformation in which the inner wall portion 101a and the outer wall portion 101b are separated from each other). That is, since the press-formed article 100 receives the load while the protrusion portion 115 is in a state of having high rigidity, the deformation of the press-formed article 100 can be further suppressed, and the characteristics in the three-point bending test can be further improved.

[Vehicle Member]

Figure 5A:
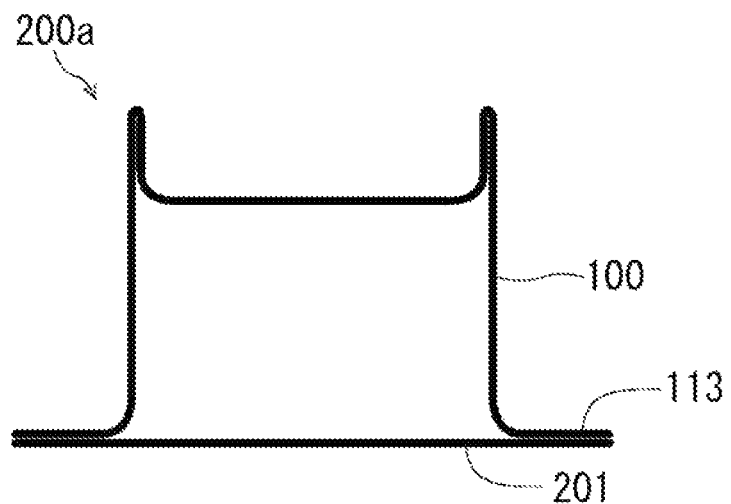
FIG. 5A is a view showing a vehicle member using the press-formed article, and is a cross-sectional view (transverse sectional view) when viewed in a cross section perpendicular to the longitudinal direction.

FIG. 5A is a transverse sectional view showing a vehicle member 200a according to a first embodiment of the present invention. The vehicle member 200a is long in one direction, is hollow in a cross section perpendicular to the longitudinal direction, and is constituted by the press-formed article 100 and a back sheet 201 (steel sheet member). For example, the vehicle member 200a is a side sill, a pillar (a front pillar, a lower front pillar, a center pillar, or the like), a roof rail, a roof arch, a bumper, a beltline reinforcement, or a door impact beam.

As shown in FIG. 5A, the vehicle structural member 200a includes the press-formed article 100, and a flat plate-shaped back sheet 201 (steel sheet member) joined to the pair of flange portions 113 of the press-formed article 100. The press-formed article 100 and the back sheet 201 are joined to each other by welding such as resistance spot welding or laser welding. A method of joining the press-formed article 100 and the back sheet 201 is not limited to welding, and for example, may be an adhesive, brazing, riveting, bolting, or friction stir welding.

Figure 5B:
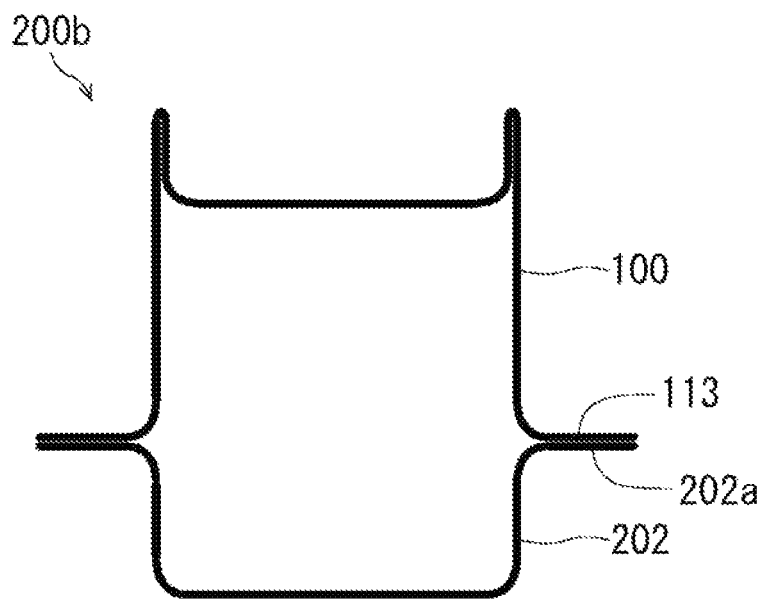
FIG. 5B is a transverse sectional view showing a first modification example of the vehicle member.

FIG. 5B is transverse sectional view showing a first modification example of the vehicle structural member 200a, and is a view showing a vehicle structural member 200b. As shown in FIG. 5B, the vehicle structural member 200b may include the press-formed article 100, and a back sheet 202 having a hat-shaped cross section with a pair of flange portions 202a joined to the pair of flange portions 113 of the press-formed article 100.

Figure 5C:
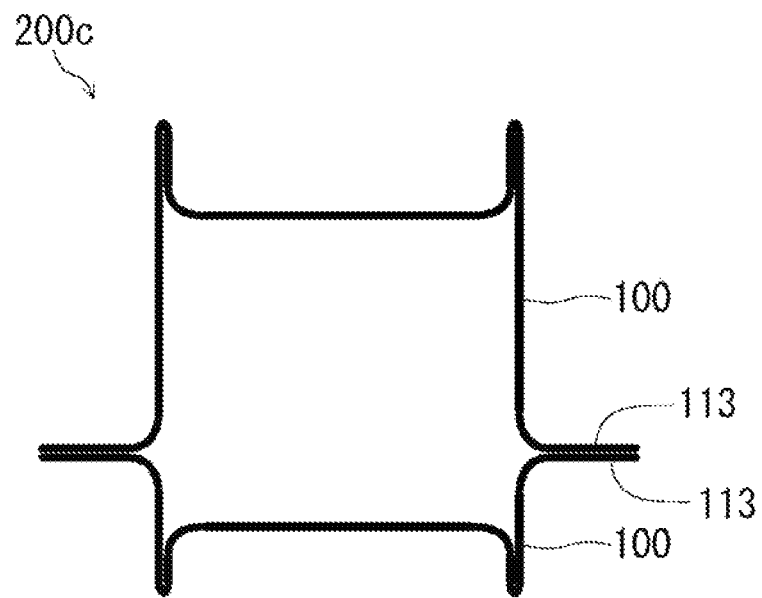
FIG. 5C is a transverse sectional view showing a second modification example of the vehicle member.

FIG. 5C is a transverse sectional view showing a second modification example of the vehicle structural member 200a. As shown in FIG. 5C, a vehicle structural member 200c may be formed by joining a pair of the press-formed articles 100 so that the flange portions 113 thereof face each other. In the vehicle structural member 200c, the heights of the pair of the press-formed articles 100 may be different from each other or may be the same.

[Manufacturing Method of Hot-Stamping Formed Article]

Next, a manufacturing method of a hot-stamping formed article (hereinafter, also referred to as "a manufacturing method of a press-formed article") according to the embodiment will be described. The manufacturing method of a press-formed article according to the embodiment is a method for obtaining the press-formed article 100 (hot-stamping formed article) by performing press working on a single base steel sheet, and includes a first step of preparing a preliminary formed article 301, and a second step of forming the preliminary formed article 301 into the press-formed article 100 by hot stamping (hot pressing). Since a heated steel sheet has high ductility, by performing the second step by hot stamping, the generation of forming defects such as cracks can be suppressed when a base steel sheet having high tensile strength is formed into the press-formed article 100, and the tensile strength can be increased by rapid cooling after pressing.

Figure 6:
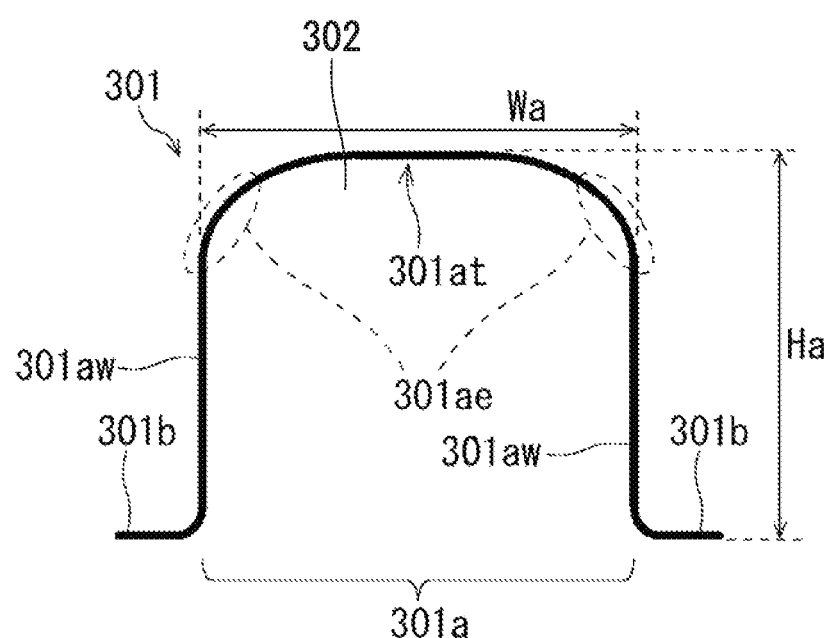
FIG. 6 is a transverse sectional view showing an example of a preliminary formed article used for manufacturing the press-formed article.

FIG. 6 is a transverse sectional view showing an example of a preliminary formed article used for manufacturing a press-formed article. First, in a first step, for example, a single base steel sheet having a tensile strength of 590 MPa or more is plastically deformed by cold press working, thereby obtaining the preliminary formed article 301 (deformed steel sheet) for manufacturing the press-formed article 100 shown in FIG. 6. As shown in FIG. 6, since the preliminary formed article 301 is plastically deformed, the shape thereof is maintained in a state in which no load is applied. From the viewpoint of manufacturing a press-formed article having a higher tensile strength, the tensile strength of the base steel sheet is more preferably 780 MPa or more, preferably 980 MPa or more, preferably 1200 MPa or more, more preferably 1500 MPa or more, and even more preferably 1800 MPa or more. The upper limit of the tensile strength of the base steel sheet is not particularly limited, but is, for example, 2500 MPa or less.

In addition, since the deformation of the base steel sheet into the preliminary formed article 301 is usually not that large, cold working (cold pressing) can be performed. However, as necessary, hot working (for example, hot pressing) may also be performed.

In order to secure a desired strength during hot stamping, the chemical composition of the base steel sheet preferably includes a C content: 0.090 to 0.400 mass %, Mn: 1.00 to 5.00 mass %, and B: 0.00050 to 0.05000 mass %. In addition, as a representative chemical composition of the base steel sheet for increasing a tensile strength after quenching to 1500 MPa or more, a chemical composition including C: 0.200 mass %, Si: 0.0200 mass %, Mn: 1.30 mass %, Al: 0.030 mass %, Ti: 0.02 mass %, and B: 0.00150 mass % can be exemplified.

As shown in FIG. 6, the preliminary formed article 301 is hat-shaped in a cross section, and includes a U-shaped portion 301a and flat parts 301b (flange portion equivalent portions) corresponding to the pair of flange portions 113 of the press-formed article 100. In the preliminary formed article 301, a recessed part 302 (a space in the U-shaped portion 301a) is formed by the U-shaped portion 301a.

The U-shaped portion 301a includes a pair of standing wall portion equivalent portions 301aw corresponding to the pair of standing wall portions 111 of the press-formed article 100, a top sheet portion equivalent portion 301at corresponding to the top sheet portion 112 of the press-formed article 10, and protrusion portion equivalent portions 301ae corresponding to the protrusion portions 115 of the press-formed article 100. In the preliminary formed article 301, the pair of standing wall portion equivalent portions 301aw are bent in the same direction with respect to the top sheet portion equivalent portion 301at. In other words, the pair of two standing wall portion equivalent portions 301aw are bent toward one principal surface side of the top sheet portion equivalent portion 301at.

The preliminary formed article 301 is not limited to the press working, and may also be formed by deforming the base steel sheet by another method.

The length (cross-sectional length) of the U-shaped portion 301a is assumed to be Lu. Furthermore, in the press-formed article 100, the height of the standing wall portion is assumed to be Hb (corresponding to Hb1 in FIG. 11A), and the width between the two standing wall portions is assumed to be Wb (corresponding to Wb1 in FIG. 11A). The U-shaped portion 301a includes, in addition to the standing wall portion equivalent portions 301aw and the top sheet portion equivalent portion 301at, the protrusion portion equivalent portions 301ae which are to become the protrusion portions 115 by a step described later. Therefore, the length Lu, the width Wb, and the height Hb satisfy the relationship of Wb+2Hb<Lu. Furthermore, the width of the U-shaped portion 301a is assumed to be Wa, and the height of the U-shaped portion 301a is assumed to be Ha. At this time, the relationship of Wb≤Wa and the relationship of Wb+2Hb<Wa+2Ha are satisfied. In the U-shaped portion 301a of the preliminary formed article 301 shown in FIG. 6, there is no well-defined boundary between the protrusion portion equivalent portions 301ae and the other portions.

The second step is performed by hot stamping. That is, by pressing and rapidly cooling the heated steel sheet, press working and quenching are simultaneously performed.

Specifically, in the second step, first, the preliminary formed article 301 is heated to a predetermined quenching temperature. The quenching temperature is a temperature higher than an A3 transformation point (more specifically, Ac3 transformation point) at which the preliminary formed article 301 is austenitized (for example, a temperature higher than the Ac3 transformation point by 80° C. or higher), and for example, may be 910° C. or higher. The heating is performed, for example, by heating the preliminary formed article 301 using a heating apparatus.

Next, the heated preliminary formed article 301 is placed on a pressing apparatus 10 shown in FIGS. 7A to 7D and is subjected to press working. FIGS. 7A to 7D are views showing the pressing apparatus 10, and are cross-sectional views (transverse sectional views) when viewed in a cross section perpendicular to the longitudinal direction. FIGS. 7A to 7D illustrate a case of performing press working on the preliminary formed article 301 in which the end portion of the flat part 301b (see FIG. 6) which is to become the flange portion 113 is bent downward.

Figure 7A:
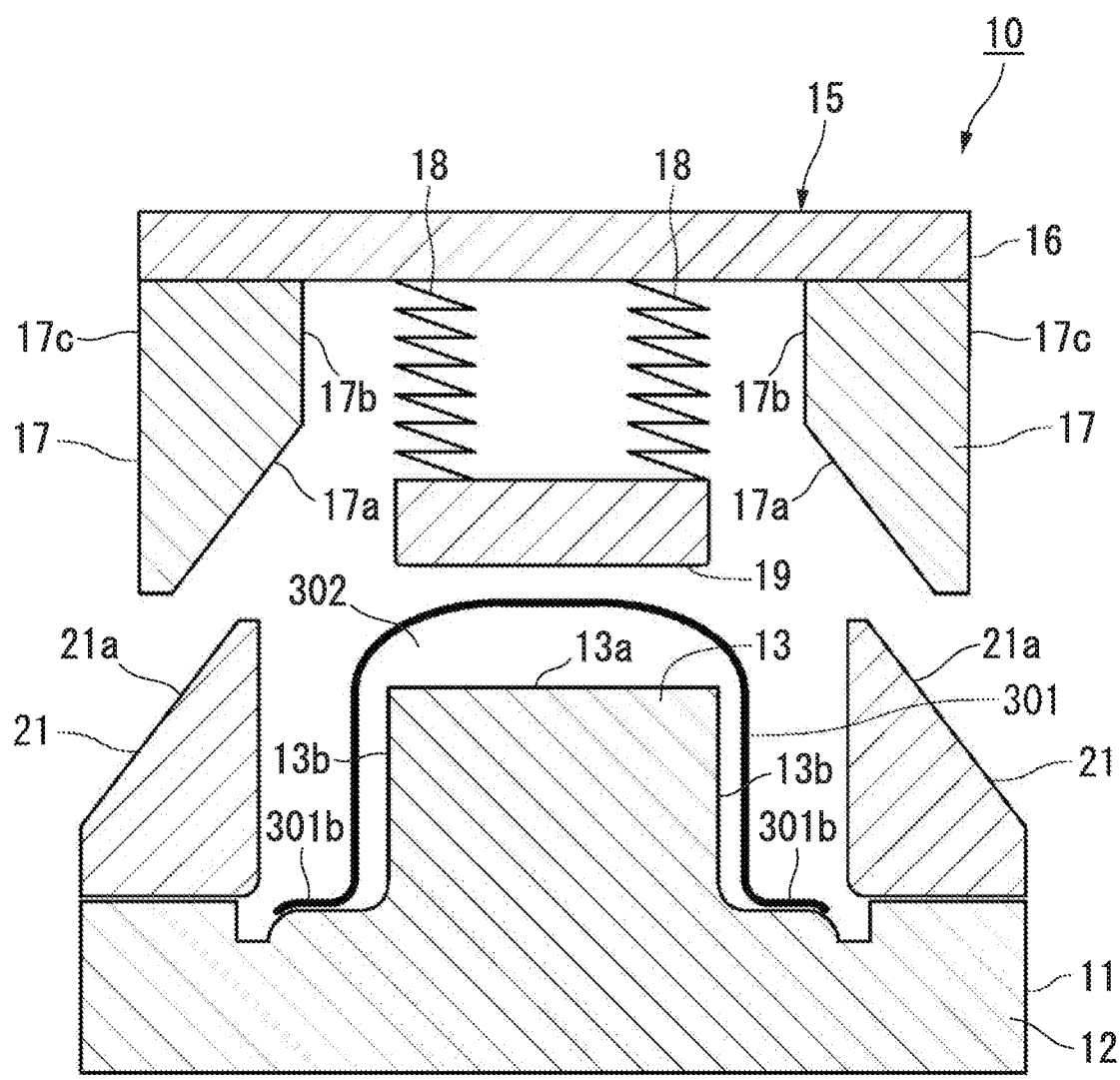
FIG. 7A is a transverse sectional view showing a pressing apparatus for manufacturing the press-formed article, and is a view showing a state in which the preliminary formed article in which end portions are bent downward is placed.

As shown in FIG. 7A, the pressing apparatus 10 includes a lower die 11, an upper die 15 which is disposed so as to face the lower die 11 and moves in a vertical direction toward the lower die 11, and a pair of cam dies (slide dies) 21 which are provided on the lower die 11 and oppose each other.

The lower die 11 includes a base portion 12, and a protrusion 13 which is provided on the base portion 12 and protrudes toward the upper die 15.

The upper die 15 includes a plate 16, a pair of cam pressing dies 17 (slide pressing dies) which are provided at the end portions of the plate 16 in the width direction and oppose each other, and a punch portion 19 which is disposed between the pair of cam pressing dies 17 and is fixed to the plate 16 via an extension and contraction mechanism 18. In the upper die 15, the plate 16 is installed in a press forming machine (not shown) and is movable in the vertical direction toward the lower die 11.

Each of the pair of cam pressing dies 17 has a shape that tapers toward its lower end. Specifically, each of the pair of cam pressing dies 17 of the upper die 15 has an inclined surface 17a which is connected to an inner surface 17b and is inclined to approach an outer surface 17c in a direction away from the inner surface 17b. That is, the inclined surface 17a is a surface that widens from the inner surface 17b toward the tip end (lower end) when viewed in a direction perpendicular to the inner surface 17b (width direction or horizontal direction).

As the extension and contraction mechanism 18 of the upper die 15, a spring or a hydraulic cylinder can be used.

On the base portion 12 of the lower die 11, the pair of cam dies (slide dies) 21 are provided to cause the protrusion 13 to be interposed therebetween and respectively face the pair of cam pressing dies 17. Each of the pair of cam dies 21 has an inclined surface 21a which is parallel to the inclined surface 17a of the cam pressing die 17 and is caused to abut the inclined surface 17a.

The inclined surfaces 21a of the cam dies 21 are caused to abut the inclined surfaces 17a of the cam pressing dies 17 as the cam pressing dies 17 are lowered toward the cam dies 21 (move in the vertical direction). By lowering the cam pressing dies 17 from this state, the inclined surfaces 21a of the cam dies 21 come in sliding contact with the inclined surfaces 17a of the cam pressing dies 17, and the cam dies 21 move toward side surfaces 13b of the protrusion 13 of the lower die 11 (that is, move inward in the width direction).

The punch portion 19 of the upper die 15, the protrusion 13 of the lower die 11, and the pair of cam dies 21 are configured to cool the preliminary formed article 301. For example, the punch portion 19 of the upper die 15, the protrusion 13 of the lower die 11, and the pair of cam dies 21 can cool the preliminary formed article 301 using cooling water circulating through the inside thereof. By performing press working on the preliminary formed article 301 using the cooled dies, the heated preliminary formed article 301 can be rapidly cooled while being subjected to the press working. That is, press forming and quenching can be simultaneously performed. It is preferable that the cooling rate when the heated preliminary formed article 301 is cooled by the pressing apparatus 10 is 30° C./s or more. In other words, it is preferable that the protrusion 13 of the lower die 11 and the pair of cam dies 21 cool the heated preliminary formed article 301 at a cooling rate of 30° C./s or more.

As shown in FIG. 7A, in the second step, first, the preliminary formed article 301 heated in advance is placed on the lower die 11 so that the protrusion 13 protrudes in the recessed part 302. At this time, the preliminary formed article 301 is placed on the lower die 11 so as not to come into contact with the protrusion 13 of the lower die 11, the punch portion 19 of the upper die 15, and the pair of cam dies 21. Here, as described above, the protrusion 13 of the lower die 11, the punch portion 19 of the upper die 15, and the pair of cam dies 21 are in a cooled state so as to cool the preliminary formed article 301 after hot pressing. Therefore, when the heated preliminary formed article 301 is placed on the lower die 11, in a case where the heated preliminary formed article 301 comes into contact with the protrusion 13 of the lower die 11, the punch portion 19 of the upper die 15, and the pair of cam dies 21, the preliminary formed article 301 is cooled before the hot pressing and the temperature thereof decreases. Therefore, by placing the preliminary formed article 301 on the lower die 11 so as not to come into contact with the protrusion 13 of the lower die 11, the punch portion 19 of the upper die 15, and the pair of cam dies 21, the preliminary formed article 301 can be prevented from being cooled before the hot pressing and decreasing in temperature. As a result, press working can be performed on the preliminary formed article 301 having high tensile strength while being maintained at a temperature of the Ac3 transformation point or higher (for example, a temperature higher than the Ac3 transformation point by 80° C. or higher). Therefore, the generation of forming defects such as cracks can be suppressed, and the preliminary formed article 301 can be rapidly cooled after the pressing.

Furthermore, as shown in FIG. 7A, in the pressing apparatus 10, recessed parts corresponding to the end portions of the flat parts 301b of the preliminary formed article 301, which are bent downward, are provided in the base portion 12 of the lower die 11. By providing such recessed parts, the end portions of the flat parts 301b can be easily inserted between the lower surfaces of the cam dies 21 and the base portion 12.

Figure 7B:
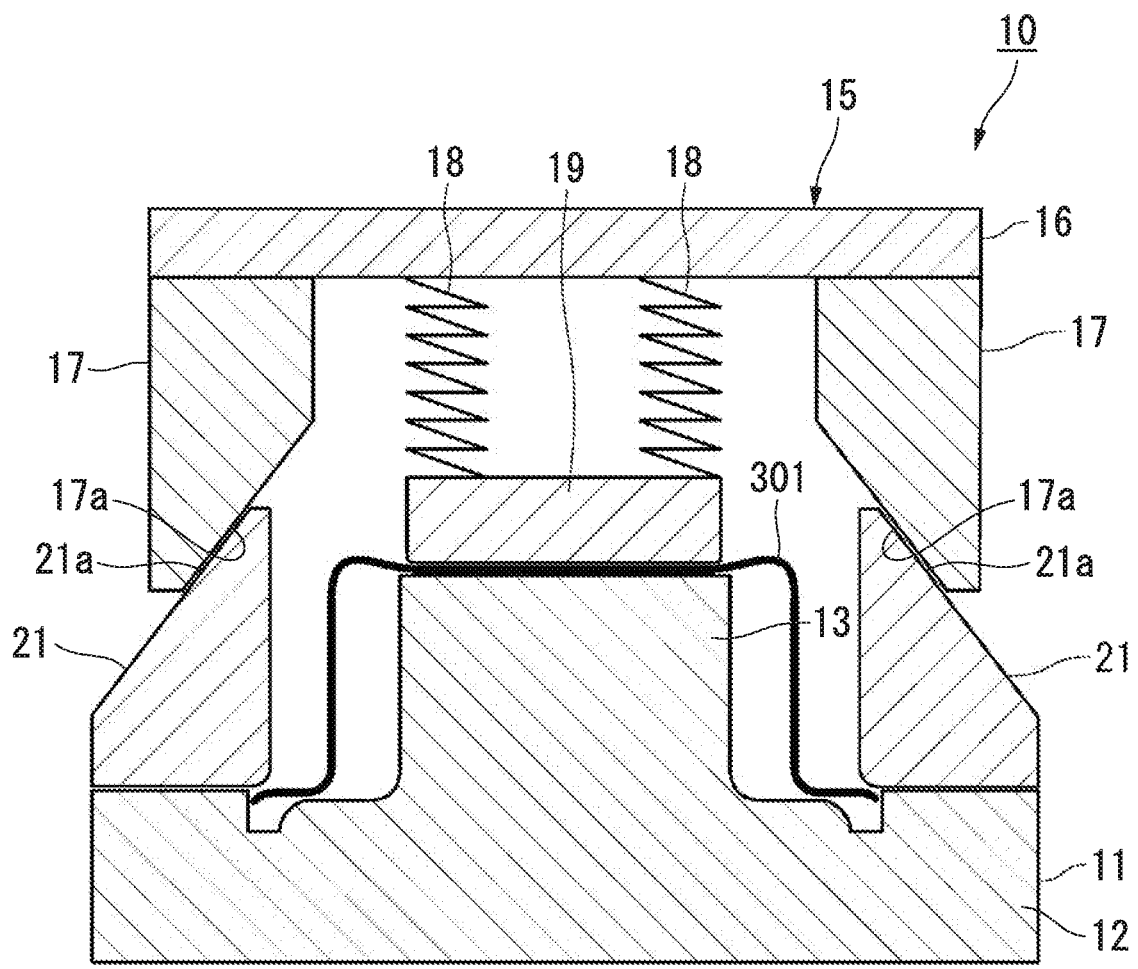
FIG. 7B is a transverse sectional view showing a continuation of a manufacturing method by the pressing apparatus, and is a view showing a state in which a portion of the preliminary formed article is restrained by an upper die and a lower die.

Subsequently, as shown in FIG. 7B, by lowering the upper die 15 (by moving in the vertical direction toward the lower die 11), a portion of the preliminary formed article 301 which is to become the top sheet portion of the press-formed article 100 is pressed by the punch portion 19. At this time, since the punch portion 19 is biased toward an upper surface 13a of the protrusion 13 by the extension and contraction mechanism 18, the preliminary formed article 301 can be pressed. In addition, the portion of the preliminary formed article 301, which is to become the top sheet portion, is interposed and restrained between the punch portion 19 and the upper surface 13a of the protrusion 13. The portion of the preliminary formed article 301 is brought into close contact with the punch portion 19 and the protrusion 13 and is cooled. The cooling rate at this time is preferably 30° C./s or more as described above.

Figure 7C:
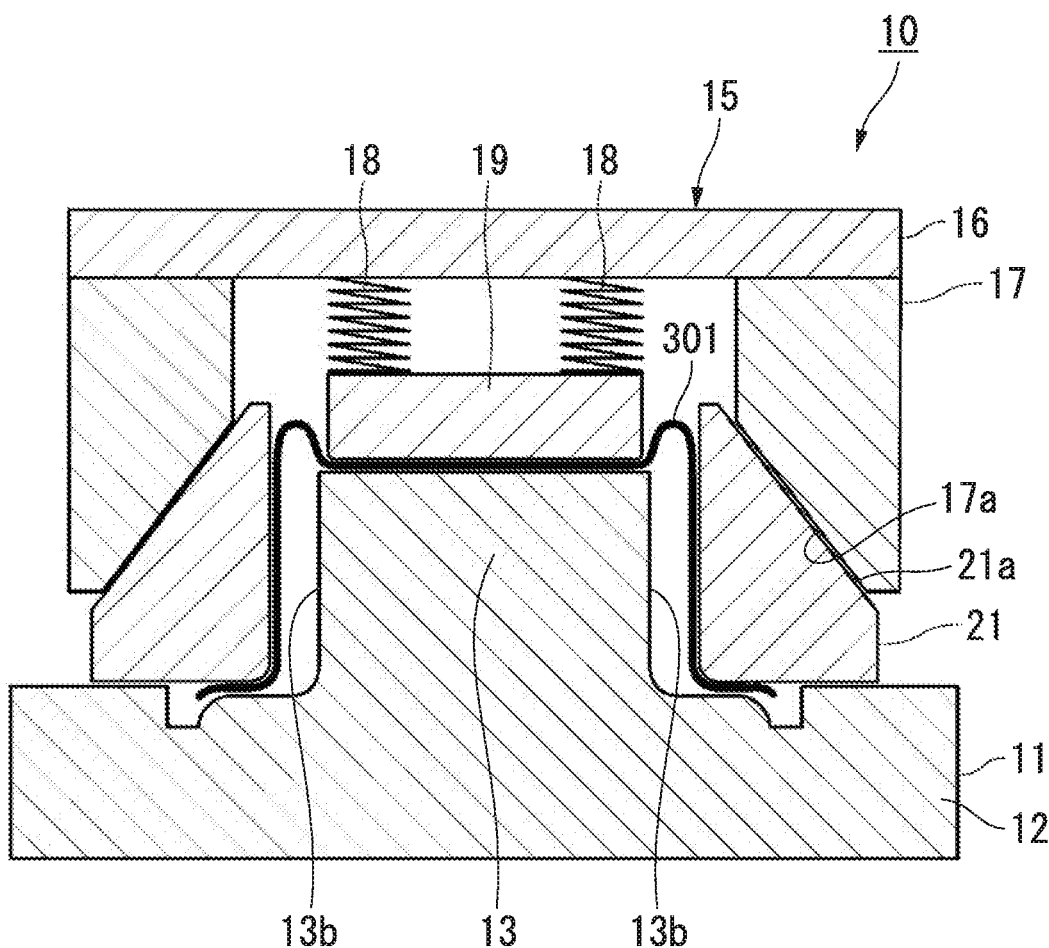
FIG. 7C is a transverse sectional view showing a continuation of the manufacturing method by the pressing apparatus.

Subsequently, as shown in FIG. 7C, the upper die 15 is further lowered from the state shown in FIG. 7B. At this time, the upper die 15 is lowered while the inclined surfaces 17a of the cam pressing dies 17 abut the inclined surfaces 21a of the cam dies 21. Accordingly, the cam dies 21 receive a force directed inward in the width direction from the cam pressing dies 17 and move in the horizontal direction toward the side surfaces 13b of the protrusion 13. By the movement of the cam dies 21, the preliminary formed article 301 is pressed inward in the width direction. In addition, since the preliminary formed article 301 has extra portions, the extra portions protrude upward.

Figure 7D:
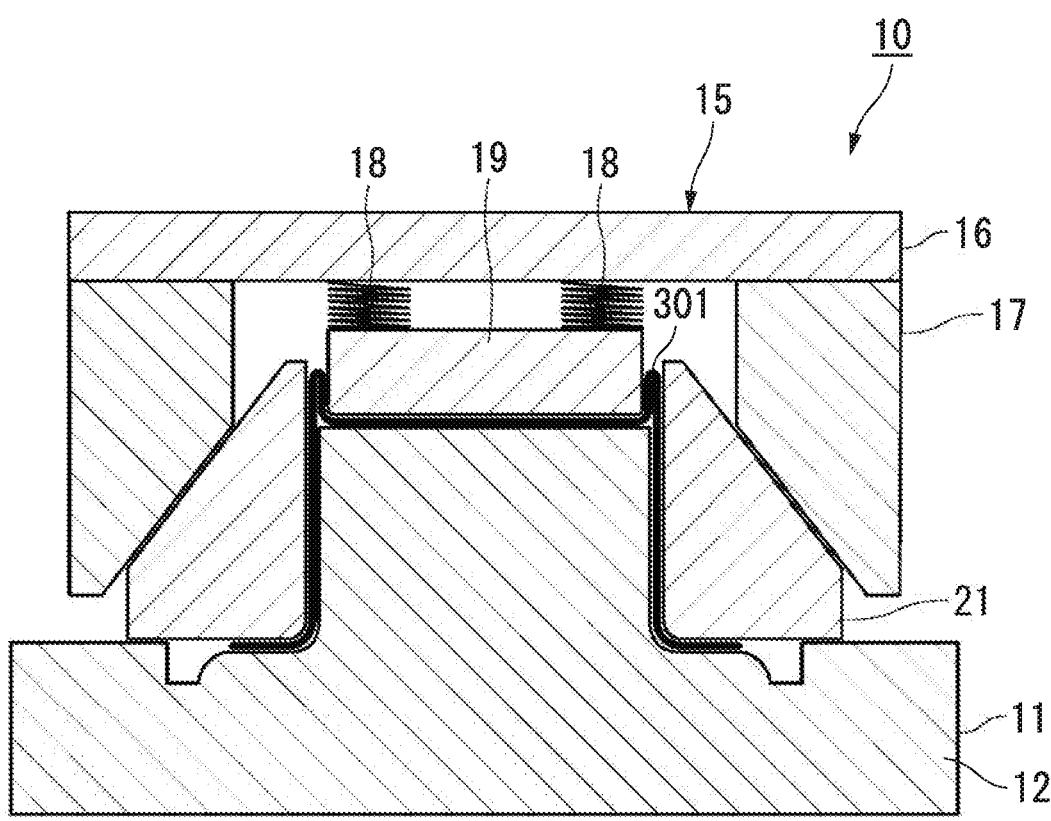
FIG. 7D is a transverse sectional view showing a continuation of the manufacturing method by the pressing apparatus.

In addition, by lowering the upper die 15 to the state shown in FIG. 7D (the bottom dead point of the upper die 15), the preliminary formed article 301 is pressed and restrained by the pair of cam dies 21 and the protrusion 13. At this time, the extra portions of the preliminary formed article 301 are folded between the cam dies 21 and the protrusion 13 and become the protrusion portions 115. The extra portions and the standing wall portion equivalent portions of the preliminary formed article 301 are brought into close contact with the pair of cam dies 21 and the protrusion 13 and are cooled. The cooling rate at this time is preferably 30° C./s or more as described above.

By the press working described above, the press-formed article 100 is manufactured from the base steel sheet. The press-formed article 100 manufactured according to the manufacturing method described above is subjected to a post-treatment as necessary.

According to the manufacturing method of a press-formed article according to the embodiment, the preliminary formed article 301 heated in advance is placed in the pressing apparatus 10 so as not to come into contact with the protrusion 13 of the lower die 11, the punch portion 19 of the upper die 15, and the pair of cam dies 21. Therefore, the preliminary formed article 301 can be prevented from being cooled before the hot pressing and decreasing in temperature. As a result, press working can be performed on the preliminary formed article 301 having high tensile strength while being maintained at a temperature of the Ac3 transformation point or higher (for example, a temperature higher than the Ac3 transformation point by 80° C. or higher). Therefore, the press-formed article 100 can be manufactured from the base steel sheet while suppressing the generation of forming defects such as cracks. In addition, since the preliminary formed article 301 can be rapidly cooled after the pressing, the tensile strength can be increased.

In a case where a base steel sheet is cold-formed into the press-formed article 100, when the tensile strength of the base steel sheet is less than 780 MPa, it is possible to perform forming without the generation of forming defects such as cracks in the protrusion portion. However, in a case where a base steel sheet having a tensile strength of 780 MPa or more is formed into the press-formed article 100, there is concern that forming defects such as cracks may be generated in the protrusion portion. Therefore, the manufacturing method of a press-formed article according to the embodiment is particularly useful in a case where the tensile strength of the base steel sheet is 780 MPa or more.

In the manufacturing method described above, a case where restraining by the protrusion 13 and the pair of cam dies 21 is completed after restraining of the preliminary formed article 301 by the protrusion 13 and the punch portion 19 is completed is described. However, restraining of the preliminary formed article 301 by the protrusion 13 and the punch portion 19 and restraining by the protrusion 13 and the pair of cam dies 21 may be completed simultaneously. In addition, the timing of the movement of the cam dies 21 can be adjusted by changing the positions and shapes of the inclined surfaces 17a and 21a.

Furthermore, in the manufacturing method described above, a case of pressing the preliminary formed article 301 using a cam mechanism constituted by the cam dies 21 and the cam pressing dies 17 is described. However, the cam dies 21 may also be moved by a hydraulic cylinder or the like without using the cam mechanism.

Furthermore, the upper die 15 and the cam pressing dies 17 may be attached to different pressing machines and individually operated. The cam dies 21 may also be moved by a driving device directly attached to the cam dies 21 without using the cam pressing dies 17.

Figure 8:
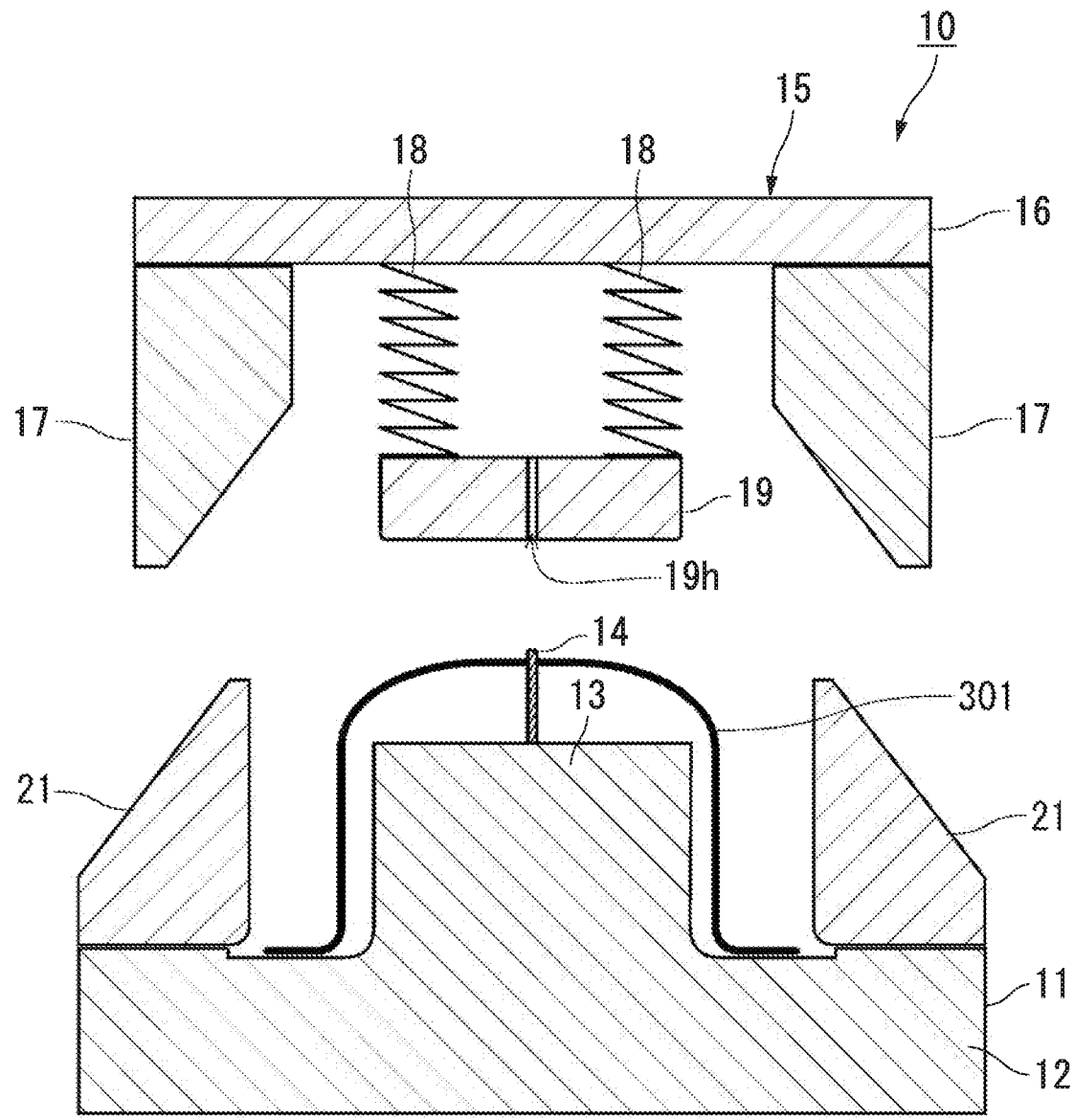
FIG. 8 is a transverse sectional view showing a modification example of the pressing apparatus.

In addition, as shown in FIG. 8, the protrusion 13 of the lower die 11 may be provided with a pin 14 protruding toward the punch portion 19, a through-hole through which the pin 14 passes may be provided in the preliminary formed article 301, and a through-hole 19h into which the pin 14 is inserted when the upper die 15 is lowered may be provided in the punch portion 19. In this case, the movement of the top sheet portion equivalent portion of the preliminary formed article 301 is suppressed, so that the protrusion portions 115 of the press-formed article 100 can be formed with good accuracy.

In a case of manufacturing the press-formed article 100 using the preliminary formed article (see FIG. 6) in which the end portion is not bent downward as shown in FIG. 8, no recessed part may be provided in the base portion 12 (see FIG. 7A).

Second Embodiment

Next, a second embodiment of the present invention will be described.

In the manufacturing method of a press-formed article according to the first embodiment, a case of forming the preliminary formed article 301 obtained by performing press working on a single base steel sheet into the press-formed article 100 using the pressing apparatus 10 is described. On the other hand, in a manufacturing method of a press-formed article according to this embodiment, a single base steel sheet B1 is formed into the press-formed article 100 using a pressing apparatus 40 shown in FIGS. 9A to 9E. That is, the manufacturing method of a press-formed article according to this embodiment is different from the manufacturing method of a press-formed article according to the first embodiment in that a single base steel sheet is formed into the press-formed article 100 by a single pressing apparatus.

Figure 9A:
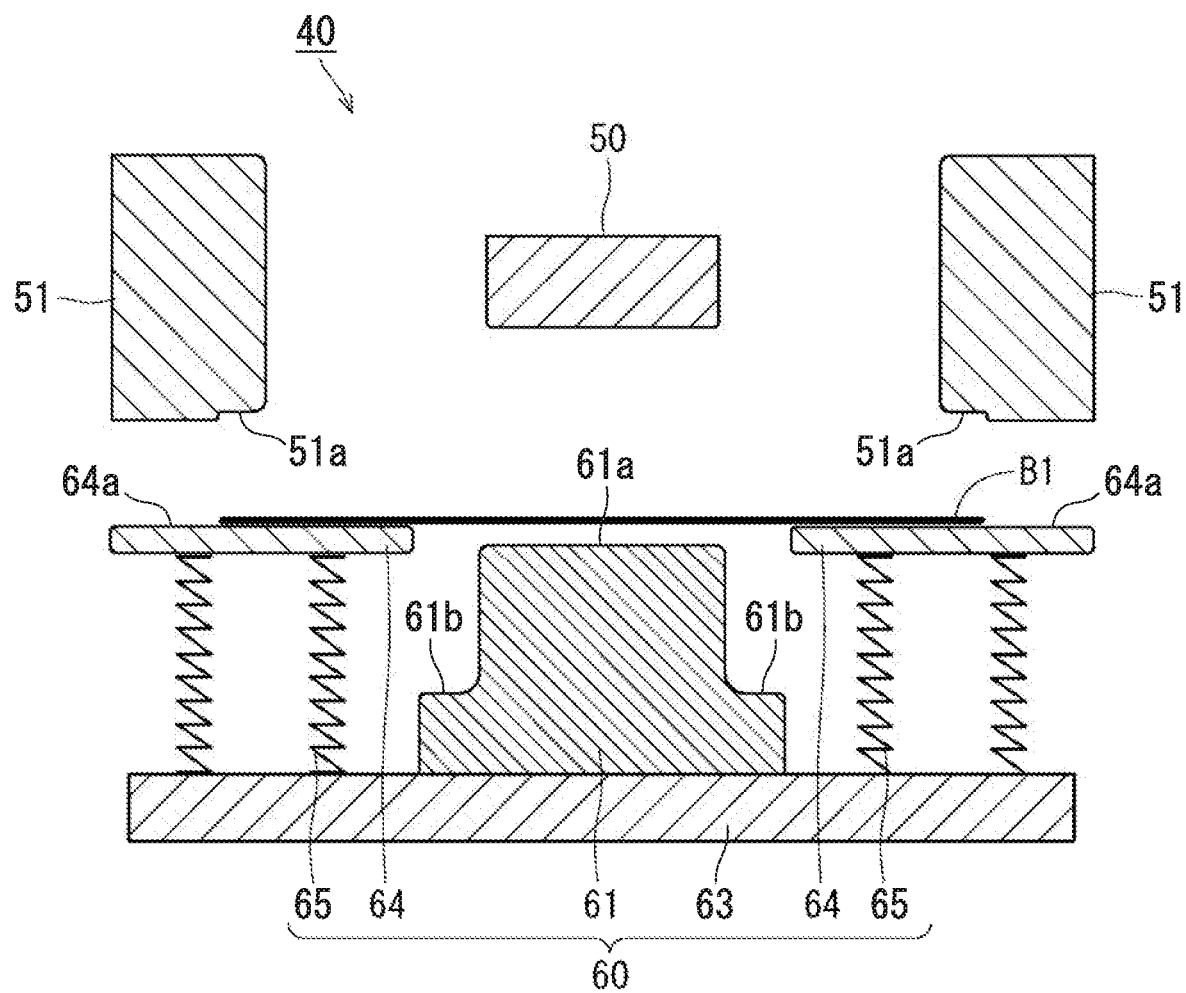
FIG. 9A is a transverse sectional view showing a pressing apparatus used in a manufacturing method of a press-formed article according to a second embodiment of the present invention.

FIGS. 9A to 9E are transverse sectional views showing the pressing apparatus 40 used in the manufacturing method of a press-formed article according to this embodiment. As shown in FIG. 9A, the pressing apparatus 40 includes a lower die 60, a punch die 50 moving toward the lower die 60, and a pair of movable dies 51 moving toward the lower die 60 and the punch die 50.

The lower die 60 includes a base portion 63, a protrusion 61 which is provided on the base portion 63, faces the punch die 50, and has stepped parts 61b, and a pair of movable plates 64 which cause the protrusion 61 to be interposed therebetween and are fixed to the base portion 63 via extension and contraction mechanisms 65. The extension and contraction mechanism 65 is, for example, an elastic body such as a spring or an actuator such as a hydraulic cylinder.

Each of the pair of movable dies 51 is movable in the vertical direction, the horizontal direction, and a direction including the vertical direction and the horizontal direction (oblique direction). In addition, the movable die 51 has a stepped part 51a at its lower end.

Each of the pair of movable plates 64 is biased upward in the vertical direction by the extension and contraction mechanism 65. In addition, in a state in which the base steel sheet B1 is placed on the pair of movable plates 64, upper surfaces 64a of the pair of movable plates 64 are positioned higher than an upper surface 61a of the protrusion 61. That is, for example, in a case where the extension and contraction mechanism 65 is an elastic body such as a spring, the spring constant and the like are adjusted so that the height positions of the upper surfaces 64a of the pair of movable plates 64 become higher than the upper surface 61a of the protrusion 61 when the weights of the base steel sheet B1 and the movable plates 64 are exerted on the extension and contraction mechanisms 65.

Next, a method of manufacturing the press-formed article 100 from the base steel sheet B1 using the pressing apparatus 40 will be described. First, the base steel sheet B1 is heated to a predetermined quenching temperature (a temperature higher than the A3 transformation point at which the base steel sheet B1 is austenitized). The base steel sheet B1 has a top sheet portion equivalent portion at the center, and includes protrusion portion equivalent portions, standing wall portion equivalent portions, and flange portion equivalent portions on both sides in this order.

Next, as shown in FIG. 9A, the heated base steel sheet B1 is placed on the pair of the movable plates 64. In this state, the base steel sheet B1 is not in contact with the protrusion 61. That is, a gap is formed between the base steel sheet B1 and the upper surface 61a of the protrusion 61.

As in the first embodiment, cooling water is circulated through the inside of the protrusion 61. Therefore, when the heated base steel sheet B1 is placed in the pressing apparatus 40, in a case where the base steel sheet B1 comes into contact with the protrusion 61, the base steel sheet B1 is cooled even before hot pressing. That is, by placing the base steel sheet B1 on the pair of the movable plates 65 as described above, the base steel sheet B1 can be prevented from being cooled before the hot pressing.

Figure 9B:
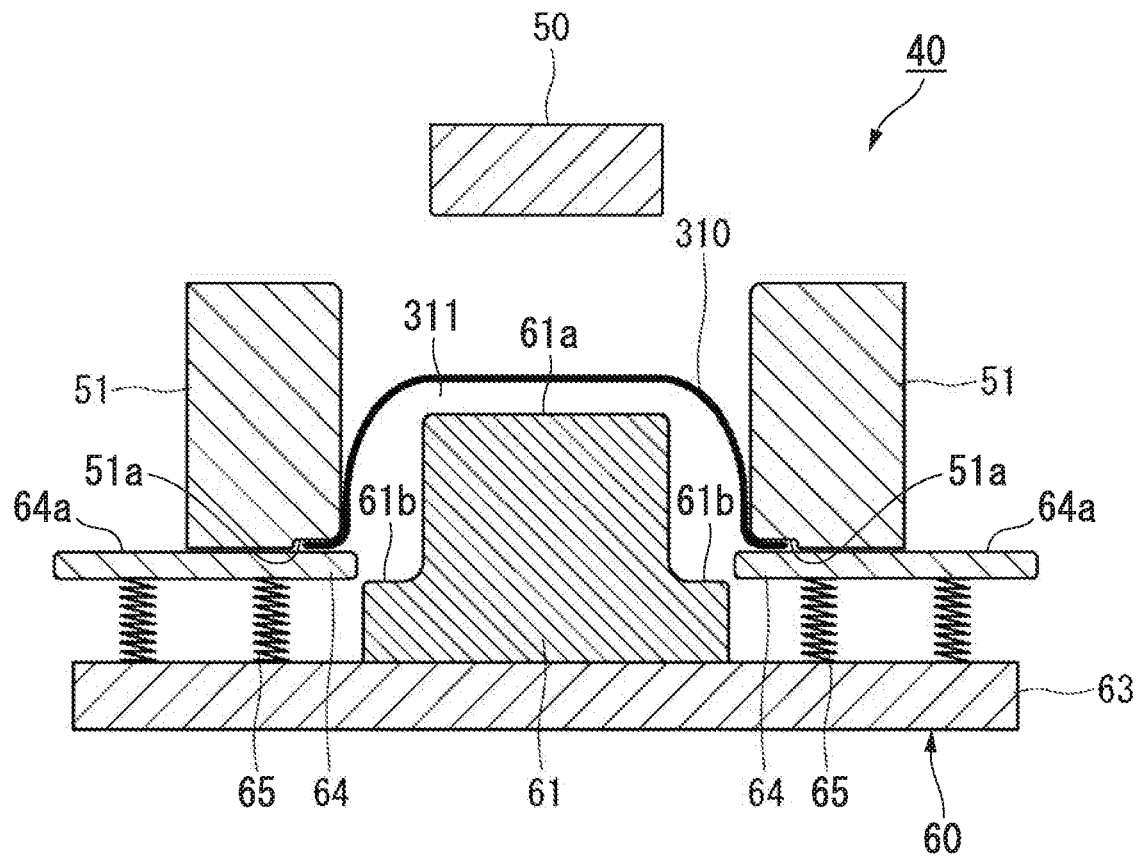
FIG. 9B is a transverse sectional view showing a continuation of the manufacturing method by the pressing apparatus.
Figure 9C:
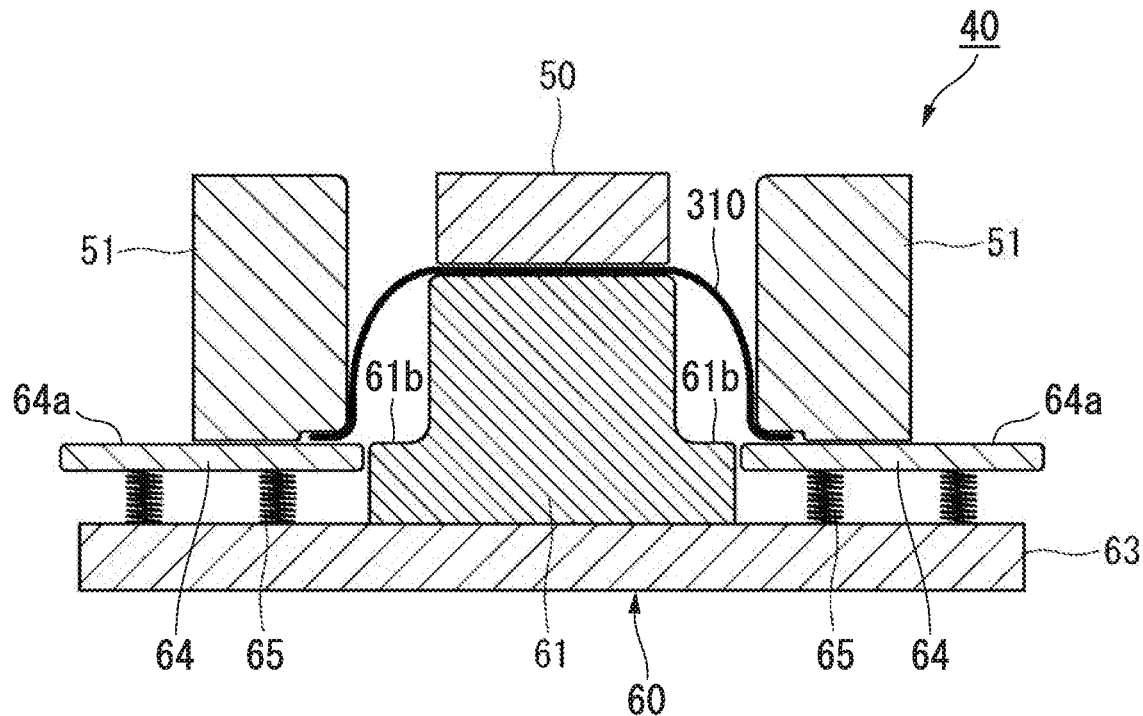
FIG. 9C is a transverse sectional view showing a continuation of the manufacturing method by the pressing apparatus.

Subsequently, from the state shown in FIG. 9A, the pair of movable dies 51 are lowered while the stepped parts of the base steel sheet B1 in the width direction are caused to abut the end portions 51a of the movable dies 51 until the upper surfaces of the stepped parts 61b and the upper surfaces of the movable plates 64 become flush with each other (the pair of movable dies 51 are moved downward in the vertical direction and the pair of movable dies 51 are moved toward the protrusion 61). In addition, FIG. 9B is a view showing a state in which the pair of movable dies 51 are being lowered, and FIG. 9C is a view showing a state in which the lowering of the pair of movable dies 51 is completed. As the pair of the movable dies 51 are lowered, the base steel sheet B1 is pressed in a state in which the end portions of the base steel sheet B1 are interposed between the pair of movable dies 51 and the movable plates 64, so that the base steel sheet B1 is bent upward in the vertical direction. As a result, a deformed steel sheet 310 shown in FIG. 15C is obtained. Similarly to the preliminary formed article 301, a recessed part 311 is formed in the deformed steel sheet 310.

The deformed steel sheet 310 may be plastically deformed or may not be plastically deformed. That is, the base steel sheet B1 may be plastically deformed into the deformed steel sheet 310, or the base steel sheet B1 may be elastically deformed into the deformed steel sheet 310.

Here, when the pair of movable dies 51 are lowered, the end portions of the base steel sheet B1 are interposed between the stepped parts 51a of the movable dies 51 and the movable plates 64. The interval between the stepped parts 51a of the movable dies 51 and the movable plates 64 is preferably larger than the sheet thickness of the end portion of the base steel sheet B1 by 0.1 to 0.3 mm. This is because the movement of the movable dies 51 in the horizontal direction is smoothly performed.

Figure 9D:
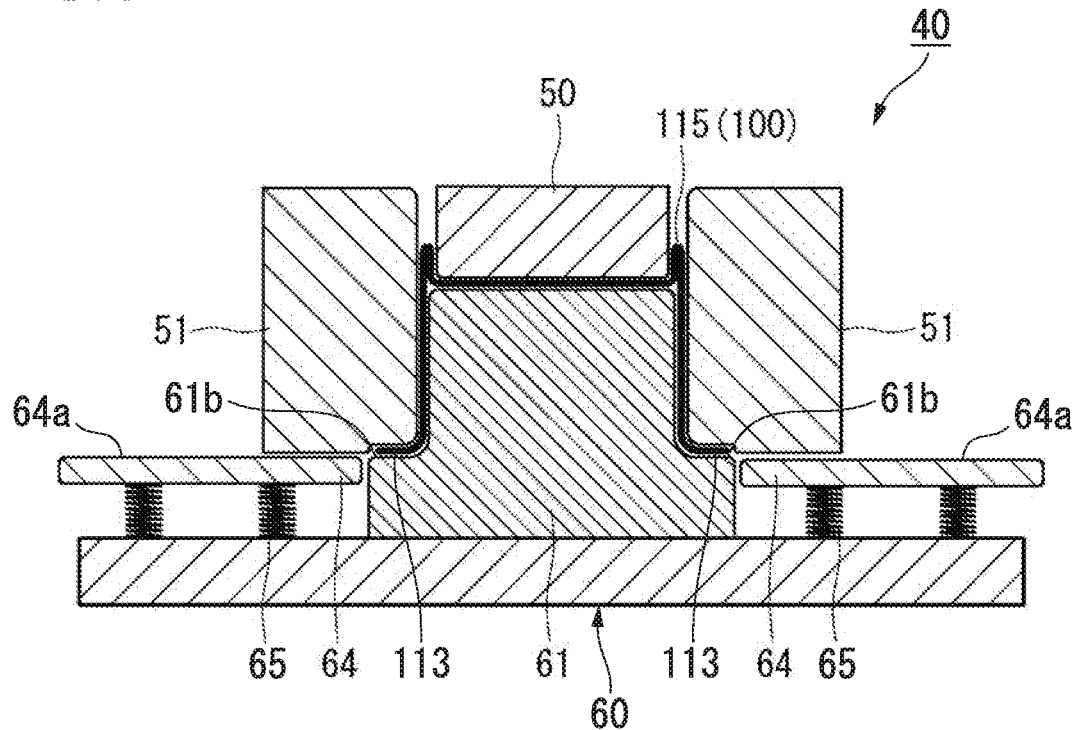
FIG. 9D is a transverse sectional view showing a continuation of the manufacturing method by the pressing apparatus.

As shown in FIGS. 9B and 9C, when the pair of movable dies 51 are lowered, the punch die 50 is also moved toward the protrusion 61 in the vertical direction. Accordingly, the top sheet portion equivalent portion is pressed and restrained by the punch die 50 and the protrusion 61. That is, in the state shown in FIG. 9C, the deformed steel sheet 310 is restrained by the punch die 50 and the protrusion 61. Thereafter, as shown in FIG. 9D, by moving the pair of movable dies 51 toward the protrusion 61 in the horizontal direction in a state in which the top sheet portion equivalent portion is restrained, the protrusion portion equivalent portions are interposed and pressed between the protrusion 61 and the pair of movable dies 51, so that the protrusion portions 115 are formed. As shown in FIG. 9D, in a state in which the forming of the press-formed article 100 is completed by the punch die 50, the protrusion 61, and the pair of movable dies 51, the entire flange portions 113 are positioned on the stepped parts 61b of the protrusion 61. That is, the flange portions 113 do not protrude outward from the side surfaces 61c of the protrusion 61 in the width direction (the end surfaces of the flange portions 113 in the width direction are positioned inward of the side surfaces 61c of the protrusion 61 in the width direction).

Figure 9E:
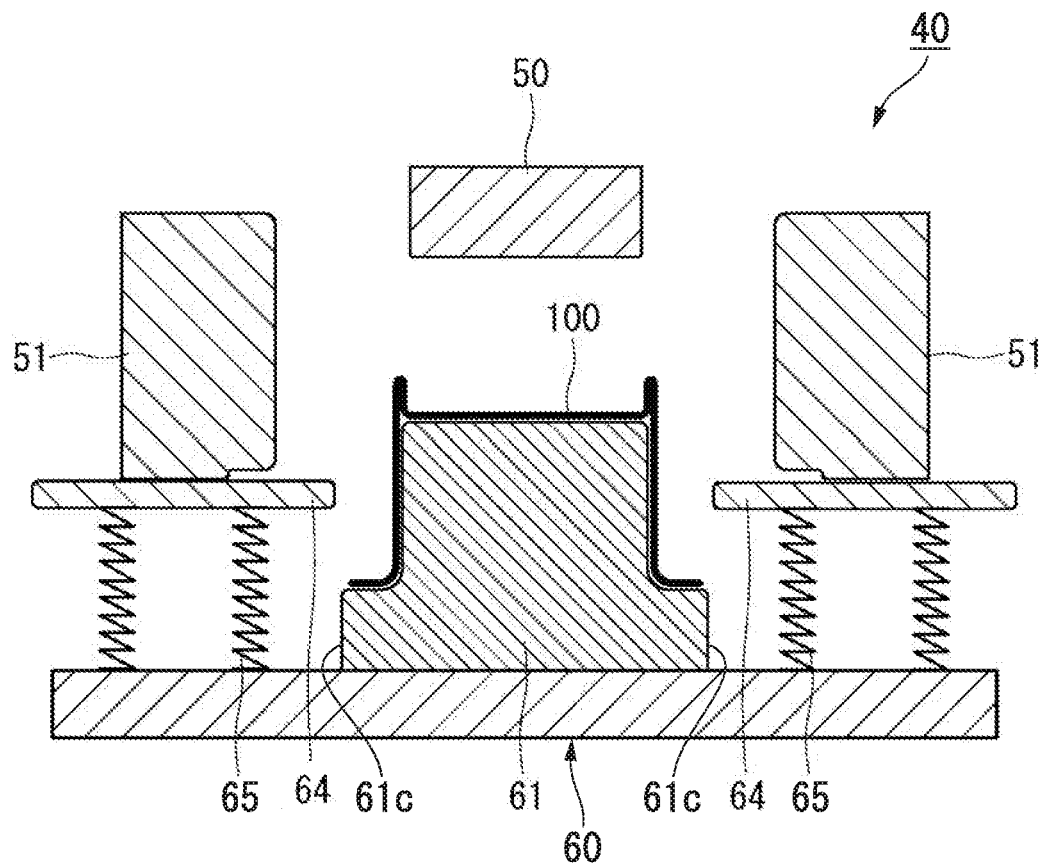
FIG. 9E is a transverse sectional view showing a continuation of the manufacturing method by the pressing apparatus.

Finally, as shown in FIG. 9E, the pair of movable dies 51, the pair of movable plates 64, and the punch die 50 are raised. Then, the press-formed article 100 is unloaded from the pressing apparatus 40.

Third Embodiment

Next, a third embodiment of the present invention will be described.

In the second embodiment, a case of manufacturing the press-formed article 100 from the base steel sheet B1 using the pressing apparatus 40 is described. On the other hand, in this embodiment, the press-formed article 100 is manufactured from the base steel sheet B1 using a pressing apparatus 70. The pressing apparatus 70 according to this embodiment is different from the pressing apparatus 40 according to the second embodiment in the shape of the protrusion 61 and the width of the movable plate 64.

Figure 10A:
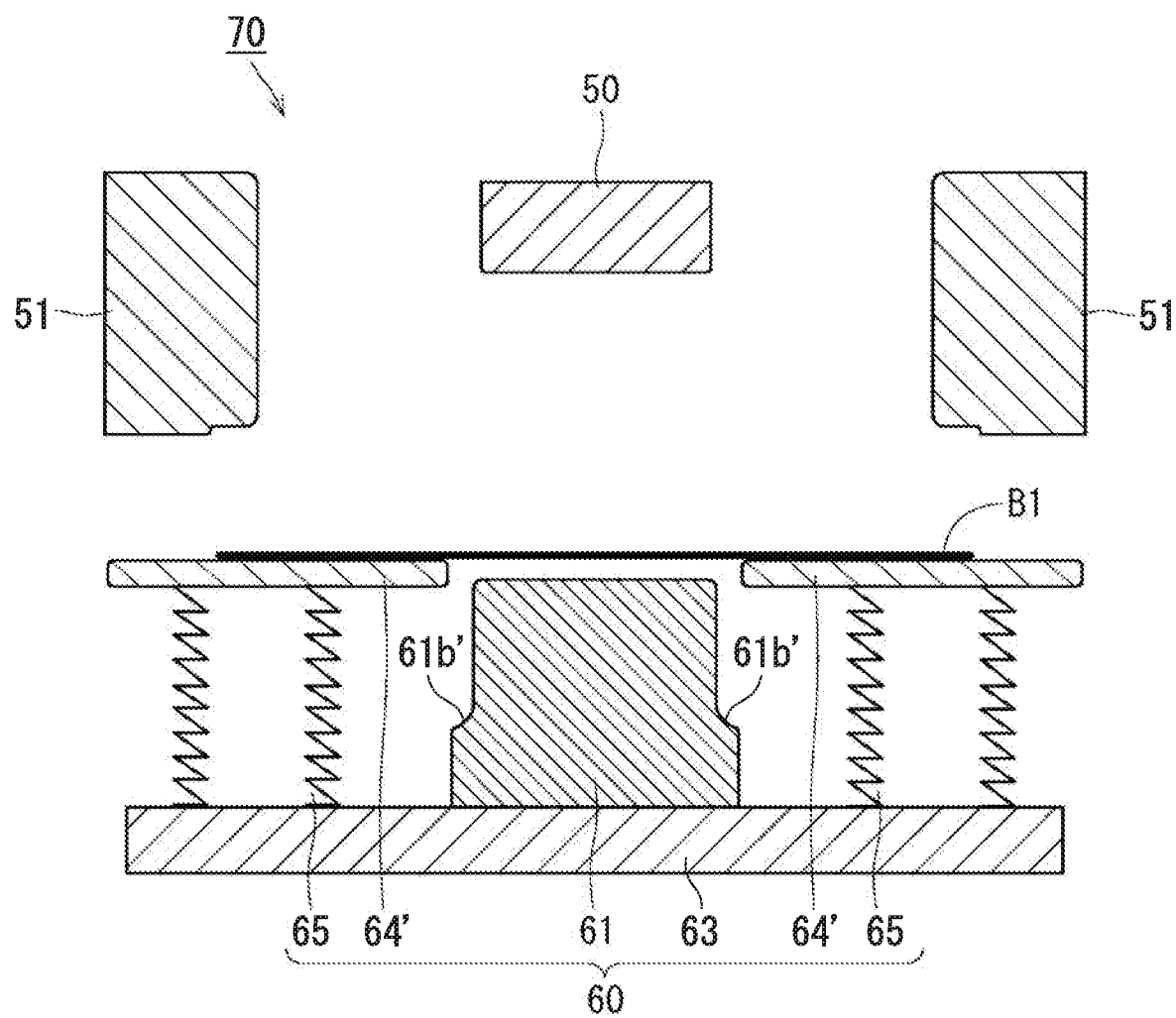
FIG. 10A is a transverse sectional view showing a pressing apparatus used in a manufacturing method of a press-formed article according to a third embodiment of the present invention.
Figure 10B:
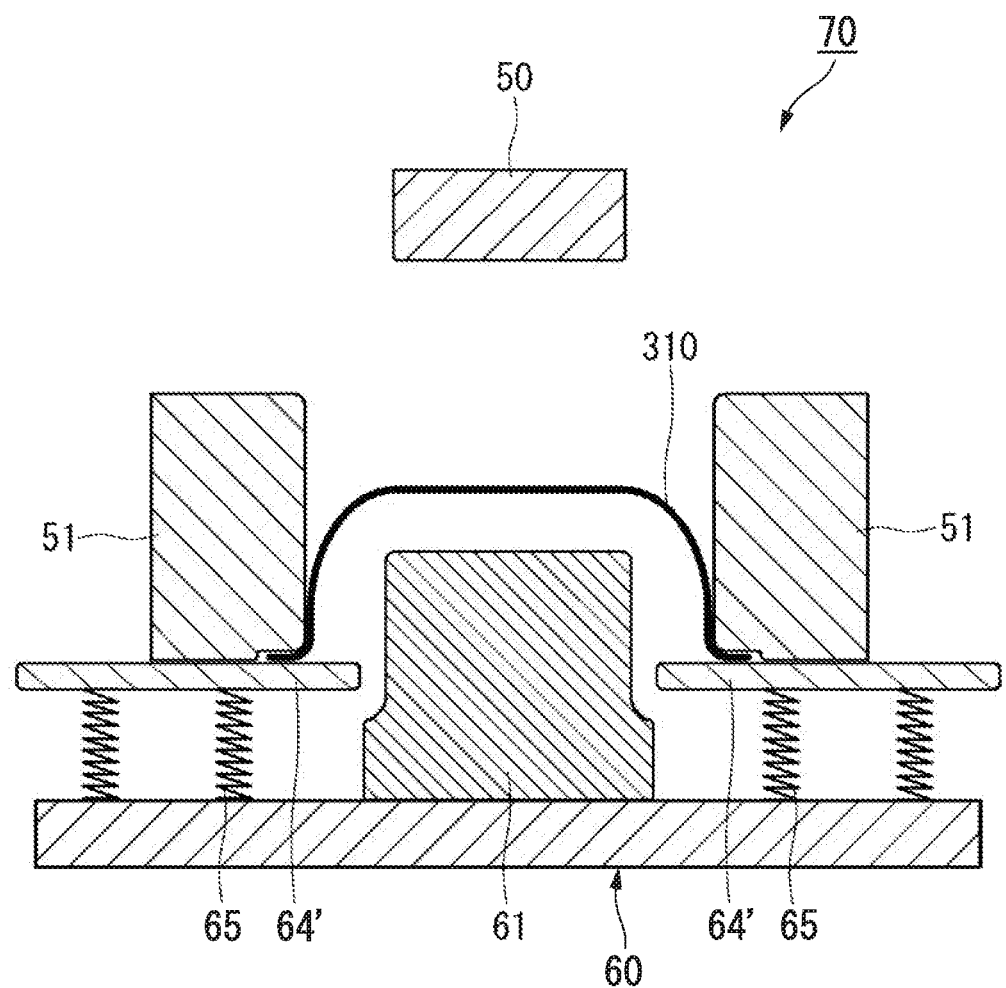
FIG. 10B is a transverse sectional view showing a continuation of the manufacturing method by the pressing apparatus.
Figure 10C:
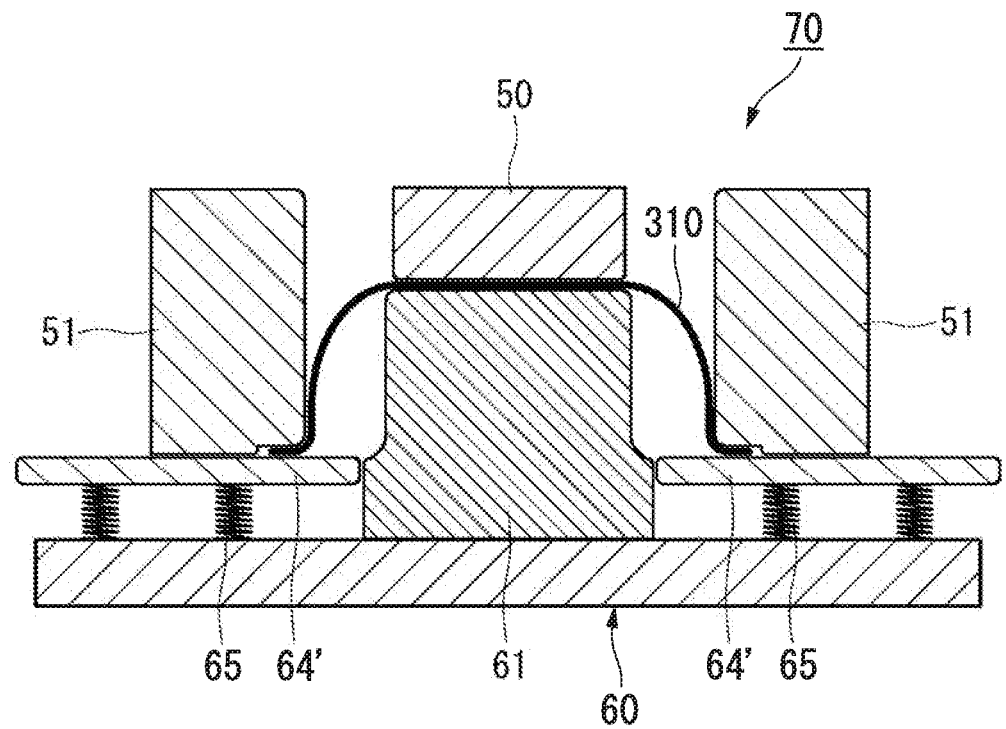
FIG. 10C is a transverse sectional view showing a continuation of the manufacturing method by the pressing apparatus.

FIGS. 10A to 10E are transverse sectional views showing the pressing apparatus 70 used in the manufacturing method of a press-formed article according to the embodiment. As shown in FIG. 10A, a stepped part 61b' of the protrusion 61 of the pressing apparatus 70 according to this embodiment has a smaller width than the stepped part 61b of the protrusion 61 of the pressing apparatus 40 according to the second embodiment. In addition, a movable plate 64' of the pressing apparatus 70 according to this embodiment has a greater width than the movable plate 64 of the pressing apparatus 40 according to the second embodiment.

In the manufacturing method of the press-formed article according to this embodiment, first, as in the manufacturing method according to the second embodiment, the base steel sheet B1 heated in advance is placed on a pair of the movable plates 64' (see FIG. 10A). Thereafter, as in the manufacturing method according to the second embodiment, the pair of movable dies 51 and the punch die 50 are lowered (see FIGS. 10B and 10C).

Figure 10D:
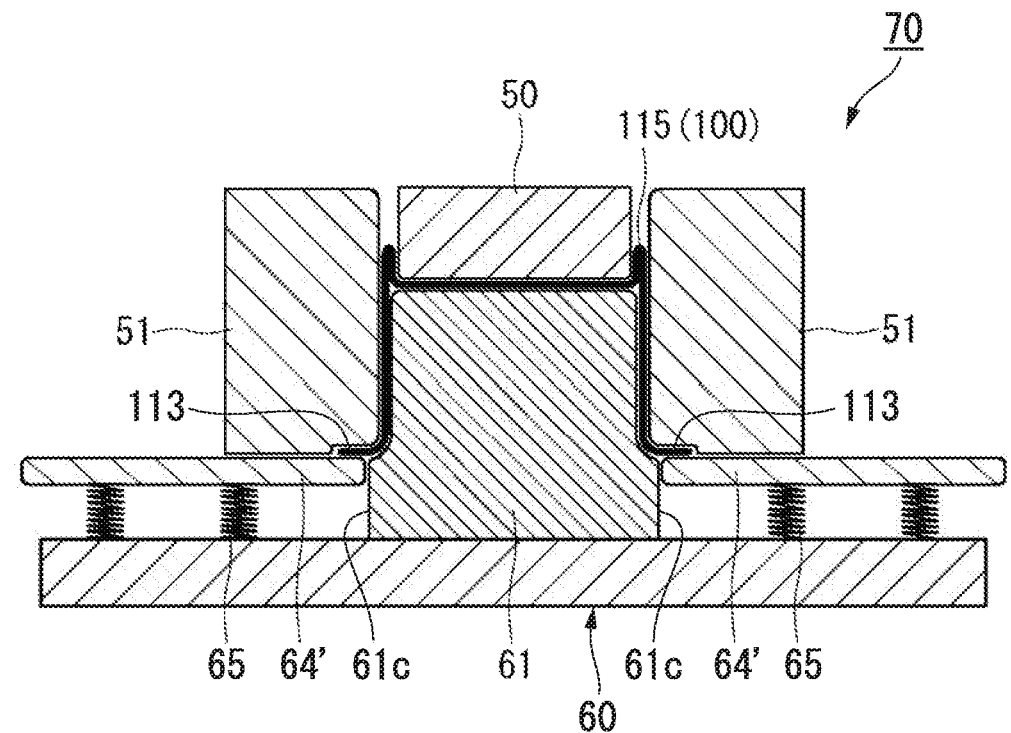
FIG. 10D is a transverse sectional view showing a continuation of the manufacturing method by the pressing apparatus.

Subsequently, by moving the pair of movable dies 51 in the horizontal direction toward the protrusion 61, the deformed steel sheet 310 is formed into the press-formed article 100 (see FIG. 10D). As shown in HG 10D, in a state in which the forming of the press-formed article 100 is completed, the end surfaces of the flange portions 113 of the press-formed article 100 in the width direction are positioned outward of the side surfaces 61c of the protrusion 61 in the width direction, and the end portions of the flange portions 113 of the press-formed article 100 in the width direction are positioned on the movable plates 64'.

Figure 10E:
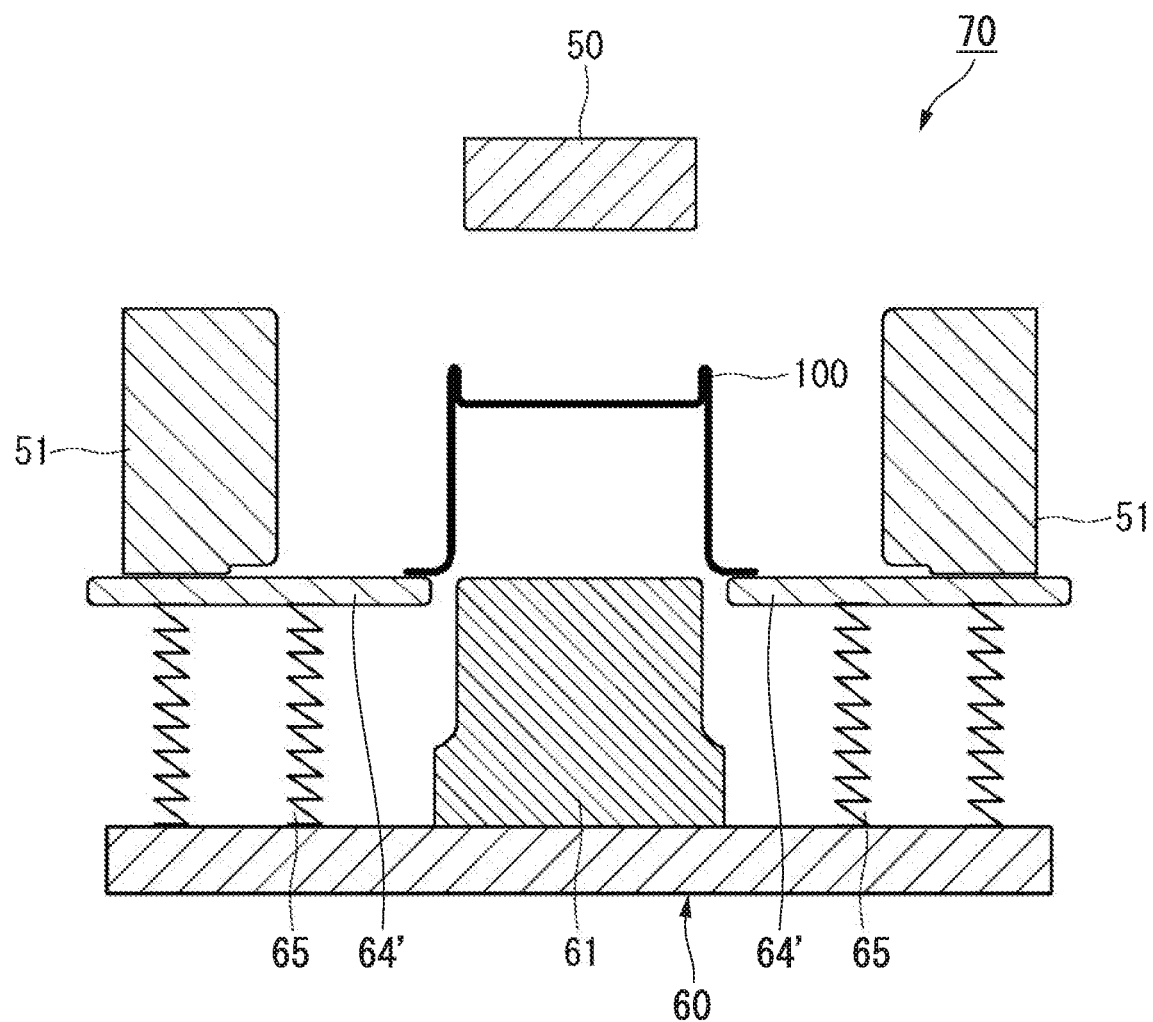
FIG. 10E is a transverse sectional view showing a continuation of the manufacturing method by the pressing apparatus.

Finally, as shown in FIG. 10E, the punch die 50, the pair of movable dies 51, and the pair of movable plates 64' are raised (the movable dies 51 are moved not only in the vertical direction but also in the horizontal direction). At this time, the end portions of the press-formed article 100 are placed on the movable plates 64' (see FIG. 10D) and thus receive a force directed upward in the vertical direction by the raising of the movable plates 64'. That is, as shown in FIG. 10E, the press-formed article 100 is also raised by the raising of punch die 50, the pair of movable dies 51, and the pair of movable plates 64'. Accordingly, an effort to take the press-formed article 100 out of the pressing apparatus can be omitted, and as a result, the time needed for manufacturing can be shortened.

EXAMPLES

Next, Examples 1 and 2 conducted to confirm the operational effects of the present invention will be described.

Example 1

In this example, a simulation of a three-point bending test was conducted on structural members according to examples of the present invention and structural members in the related art. For the simulation, a general-purpose finite element method (FEM) software (manufactured by LIVERMORE SOFTWARE TECHNOLOGY CORPORATION, trade name LS-DYNA) was used. A cross-sectional view of a sample 1 (invention example) used for the simulation as the structural member according to the present invention is schematically shown in FIG. 11A. The structural member in FIG. 11A includes the press-formed article 100 and the back sheet 201 welded to the flange portions 113 thereof. The size of the sample 1 shown in FIG. 11A is as follows. However, the thickness of the steel sheet is not considered in the size described below.

Figure 11B:
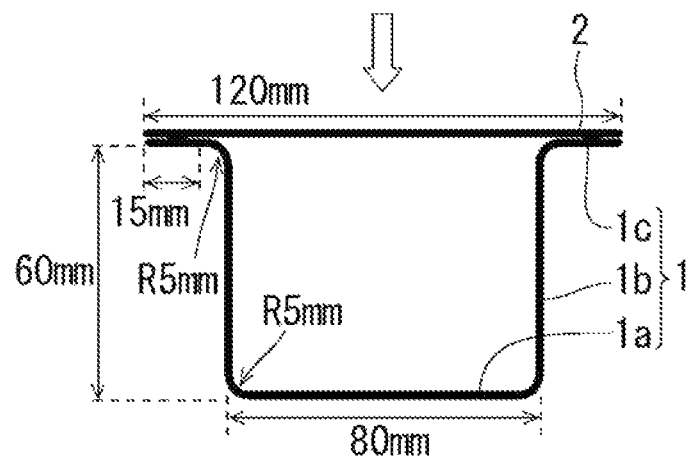
FIG. 11B is a transverse sectional view showing a sample 2 used in the example.
Figure 11C:
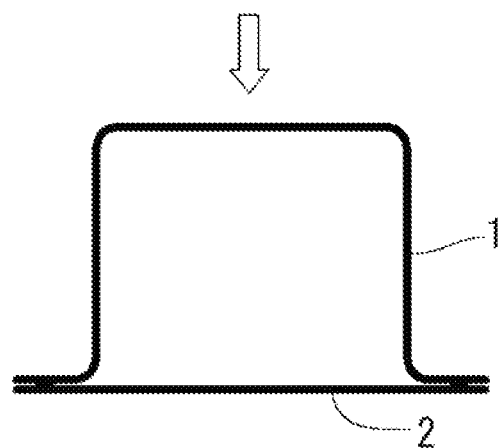
FIG. 11C is a transverse sectional view showing a sample 3 used in the example.

Angle X: 90°
Angle Y: 90°
Protruding length D of the protrusion portion: 15 mm
Height Hb1 of the standing wall portion: 60 mm
Distance (width of top sheet portion) Wb1 between the two standing wall portions: 50 mm (80-2D)
Width Wp1 of the back sheet: 90 mm (120-2D)
Radius of curvature at corner portions Ra and Rb: 5 mm
Length (overall length) in the longitudinal direction: 1000 mm Cross-sectional views of a sample 2 and a sample 3 used in the simulation as the structural members in the related art are schematically shown in FIGS. 11B and 11C. The sample 2 shown in HG 11B includes a press-formed article 1 having a hat-shaped cross section and a back sheet 2 welded to flange portions 1c thereof. The press-formed article 1 includes a top sheet portion 1a, standing wall portions 1b, and flange portions 1c. The size of the sample 2 shown in FIG. 11B is as follows.

Width of the top sheet portion 1a: 80 mm
Height of the standing wall portion 1b: 60 mm
Width of the back sheet 2: 120 mm
Radius of curvature at corner portions: 5 mm
Length in the longitudinal direction: 1000 mm The sample 2 and the sample 3 have exactly the same structure and are different only in arrangement with respect to an impactor. Specifically, in the sample 2, the back sheet 2 side is disposed on the upper side (impactor side), and in the sample 3, the top sheet portion 1a side is disposed on the upper side (impactor side). Hereinafter, the arrangement in which the back sheet side is disposed on the upper side (the arrangement of the sample 2) is referred to as an inverted hat arrangement. Furthermore, the arrangement in which the top sheet portion side is disposed on the upper side (the arrangement of the sample 3) is referred to as a positive hat arrangement. As will be described later, a collision which occurs in an actual structural member mainly occurs in the positive hat arrangement. Therefore, a comparative example of the sample 1 (example of the present invention) of the embodiment is the sample 3 having the positive hat arrangement, and the sample 2 having the inverted hat arrangement is described as a reference example.

It was assumed that the samples 1 to 3 are formed of a steel sheet having a thickness of 1.4 mm and a tensile strength of 1500 MPa. It was assumed that the flange portions of the press-formed article and the back sheet were spot-welded and fixed to each other at a pitch of 40 mm. The samples 1 to 3 were designed so that the mass per unit length in the longitudinal direction was the same.

Figure 12:
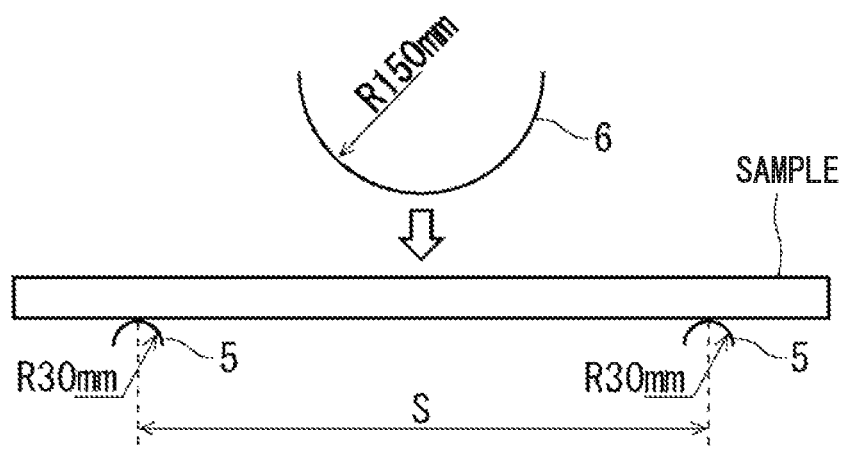
FIG. 12 is a view showing a three-point bending test.

A method of the three-point bending test using the simulation is shown in FIG. 12. FIG. 12 is a schematic side view of a case where the sample is viewed in a side view. As shown in FIG. 12, the three-point bending test was conducted by placing the sample on two fulcrums 5 and causing an impactor 6 having a cylindrical shape to collide with the sample from above. Specifically, in the case of the sample 1, the impactor 6 was caused to collide with the tip ends of the pair of protrusion portions 115 (see FIGS. 2 and 11A). In the case of the sample 2, the impactor 6 was caused to perpendicularly collide with the back sheet (see FIG. 11B). In the case of the sample 3, the impactor 6 was caused to perpendicularly collide with the top sheet portion (see FIG. 11C).

In the test of this example, the distance S between the two fulcrums 5 was set to 400 mm or 700 mm. The radius of curvature of the fulcrum 5 was set to 30 mm. The radius of curvature of the impactor 6 was set to 150 mm. The collision speed of the impactor 6 was set to 7.5 km/h.

Figure 13A:
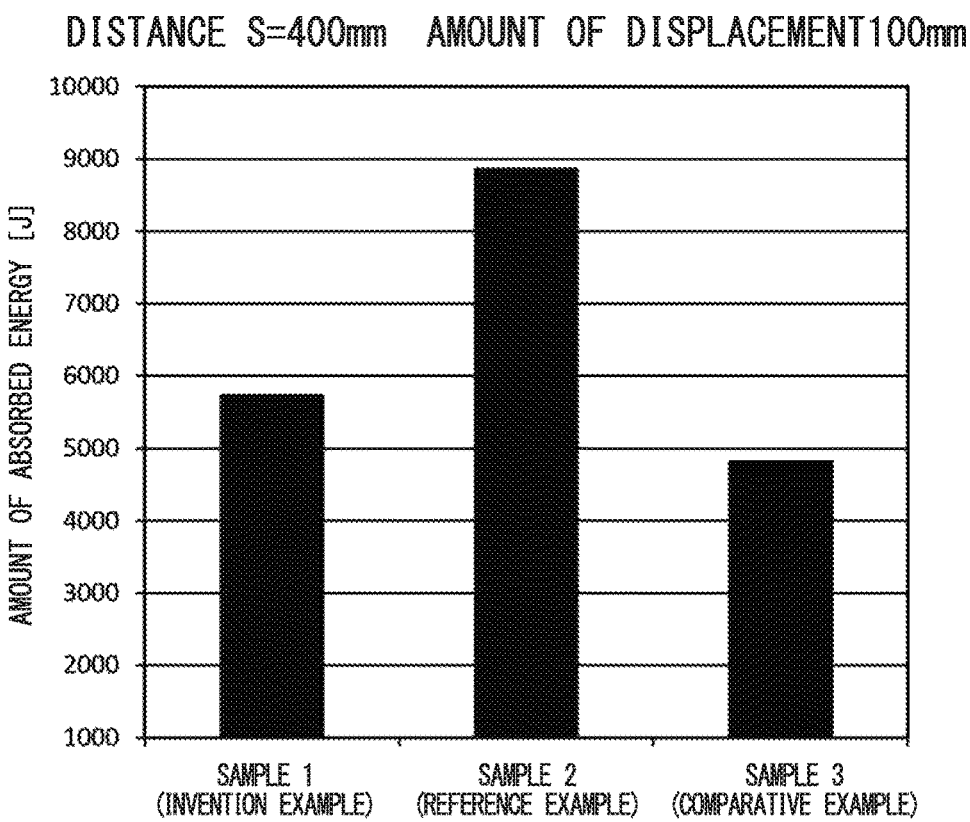
FIG. 13A is a graph showing an example of the amount of absorbed energy of each sample.
Figure 13B:
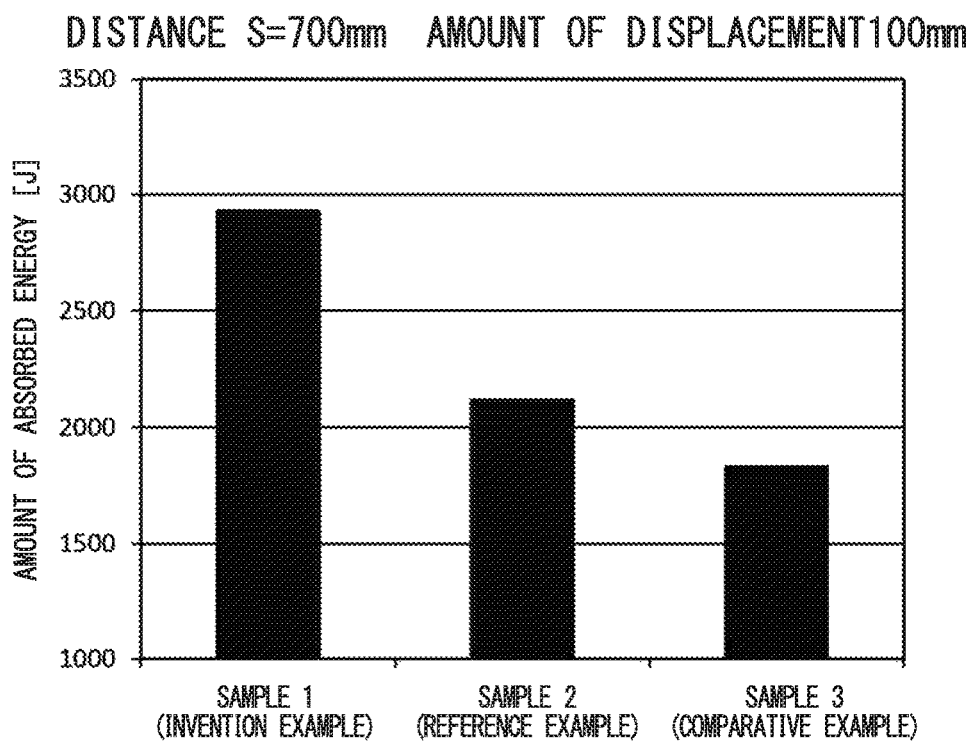
FIG. 13B is a graph showing an example of the amount of absorbed energy of each sample.

The amount of absorbed energy of each sample when the amount of displacement was 100 mm was obtained by the simulation. A vehicle structural component having a large amount of absorbed energy means that the safety of an occupant against collision is high. The result in the case where the fulcrum-to-fulcrum distance S is 400 mm is shown in FIG. 13A. The result in the case where the fulcrum-to-fulcrum distance S is 700 mm is shown in FIG. 13B. In this simulation, cracking in the steel sheet and cracking in the spot-welding portion are not considered.

Regardless of the fulcrum-to-fulcrum distance S, the amount of absorbed energy of the sample 1 (positive hat arrangement) according to the present invention was larger than the amount of absorbed energy of the sample 3 (positive hat arrangement) of the comparative example. Particularly, in a case where the fulcrum-to-fulcrum distance S is 700 mm, the amount of absorbed energy of the sample 1 was larger than the amount of absorbed energy of the sample 2 (inverted hat arrangement) of the reference example.

Figure 14:
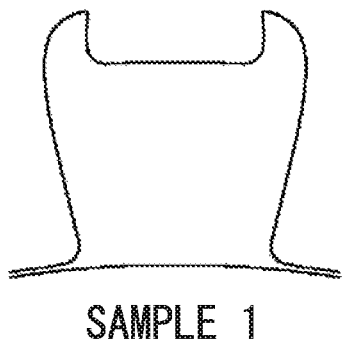
FIG. 14 is a transverse sectional view showing an example of a shape change in the sample 1 in the three-point bending test.
Figure 15:
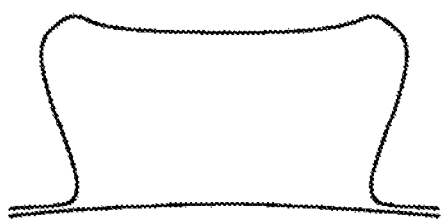
FIG. 15 is a transverse sectional view showing an example of a shape change in the sample 3 in the three-point bending test.

The cross-sectional shapes of the samples 1 and 3 when the fulcrum-to-fulcrum distance S is 400 mm and the amount of displacement is 10 mm, which are obtained by the simulation, are shown in FIGS. 14 and 15.

As shown in FIG. 15, it could be seen that in the sample 3 as the comparative example, the shape of a ridge portion collapsed, and deformation was locally concentrated. In addition, the amount of deformation of a standing wall toward the outside increases. Therefore, in the sample 3, it is considered that buckling due to three-point bending deformation is likely to occur, and as a result, the amount of absorbed energy decreases.

On the other hand, as shown in FIG. 14, it can be seen that in the sample 1 as the example of the present invention, the steel sheet on the outer side (the outer wall portion 101b of the protrusion portion 115 and the standing wall portion 111) is deformed throughout, and local deformation does not occur to the degree of the sample 3. In addition, it can be seen that the amount of deformation of the standing wall of the sample 1 toward the outside is smaller than that of the sample 3. That is, in the sample 1, it is considered that buckling due to three-point bending deformation is less likely to occur, and as a result, the amount of absorbed energy increases. As a factor of this, in the sample 1, it is considered that the rigidity was improved by providing the protrusion portion 115 having a double wall structure.

In a case where the press-formed article having a substantially hat-shaped cross section is used as a structural member for a vehicle or others, the top sheet portion side is disposed to face the outside of the body in many cases. Therefore, it is necessary to postulate that a collision at the time of an accident occurs from the top sheet portion side other than the back sheet side. From this viewpoint, even if the characteristics of the sample 2 having the inverted hat arrangement were good, it is meaningless in a case where the sample 2 is applied to an actual structural member in many cases. Therefore, characteristics against the collision from the top sheet portion side are important. In a case of a comparison in terms of a collision from the top sheet portion side, the sample of the present invention exhibited excellent characteristics compared to the sample 3 having the positive hat arrangement. Therefore, the sample of the present invention is very useful as a structural member.

Example 2

In Example 2, the relationship between the martensite fraction and the Vickers hardness MHv of the protrusion portion 115 (see FIGS. 1 and 2) of the press-formed article 100 manufactured by the manufacturing method according to the first embodiment was investigated. For comparison, the relationship between the martensite fraction and the Vickers hardness MHv of a protrusion portion of a press-formed article manufactured by a manufacturing method different from the manufacturing method was investigated.

The martensite fraction was measured in the vicinity of the center position of the overlapping portion 115d of the protrusion portion 115 in a cross section perpendicular to the longitudinal direction, that is, in the vicinity of the position of half the length of the overlapping portion 115d. Specifically, in the vicinity of the center position, from the outer surface of the inner wall portion 101a of the press-formed article 100 (the outer surface in the width direction among the two surfaces of the inner wall portion 101a of the press-formed article 100 in the width direction), along the sheet thickness direction, the position of a ¼ distance of the sheet thickness t (t/4) was used as a measurement position.

The measurement position may have a range to some extent, and from the measurement position, along the sheet thickness direction of, in each of the inner surface side and the outer surface side of the inner wall portion 101a, the range between the positions moved by a ⅛ distance of the sheet thickness t (t/8) may be used as a measurement range.

Furthermore, from the inner surface of the outer wall portion 101b of the press-formed article 100 (the inner surface in the width direction among the two surfaces of the outer wall portion 101b of the press-formed article 100 in the width direction), along the sheet thickness direction, the position of a ¼ distance of the sheet thickness t (t/4) may be used as a measurement range.

The Vickers hardness MHv was also measured in the same manner as the above-described martensite fraction (the Vickers hardness at the same position as the measurement position of the martensite fraction was measured).

The martensite fraction was obtained by reading the martensite structure from a photograph of a taken structure.

The Vickers hardness MHv was obtained by a Vickers test specified in JIS Z 2244, conducted on a cross section perpendicular to the longitudinal direction. A load of the Vickers test was set to 1 kgf. In the measurement position, the Vickers hardnesses of five different points were measured.

The measurement results of the martensite fraction and the Vickers hardness MHv are shown in Table 1 below.

No. 1 is a comparative example of a case where the preliminary formed article 301 was brought into contact with the upper surface 13a of the protrusion 13 of the lower die 11 when the preliminary formed article 301 was placed in the pressing apparatus 10 (that is, a comparative example showing the measurement results of the martensite fraction and the Vickers hardness MHv of the protrusion portion in the press-formed article manufactured according to a manufacturing method which is different from the manufacturing method according to the first embodiment in that when the preliminary formed article 301 was placed in the pressing apparatus 10, the preliminary formed article 301 was brought into contact with the upper surface 13a of the protrusion 13 of the lower die 11).

No. 2 is an invention example of a case where the preliminary formed article 301 was not brought into contact with the upper surface 13a of the protrusion 13 of the lower die 11 when the preliminary formed article 301 was placed in the pressing apparatus 10 (that is, an invention example showing the measurement results of the martensite fraction and the Vickers hardness MHv of the protrusion portion in the press-formed article manufactured according to the manufacturing method according to the first embodiment).

For Nos. 1 and 2, the same base steel sheet was used.

TABLE 1

| No. | Manufacturing conditions | Martensite fraction (%) | Vickers hardness MHv | MHv/WHv |
|---|---|---|---|---|
| 1 | Case where the preliminary formed article is brought into contact with the upper surface of the protrusion of the pressing apparatus (Comparative example) | 80 | 420 | 0.91 |
| 2 | Case where the preliminary formed article is not brought into contact with the upper surface of the protrusion of the pressing apparatus (Invention example) | 90 | 460 | 1.01 |

In addition, Table 1 shows the ratio (MHv/WHv) of the Vickers hardness MHv in the protrusion portion to the Vickers hardness WHv in the standing wall portion. The Vickers hardness WHv in the standing wall portion was measured similarly in the same cross section as for the Vickers hardness MHv in the protrusion portion. In addition, this measurement was performed in the vicinity of the center position of the standing wall portion, that is, in the vicinity of the position of half the height of the standing wall portion.

As shown in Table 1, in the press-formed article 100 according to the present invention (the invention example of No. 2), the martensite fraction was 90% or more, and the Vickers hardness MHv in the protrusion portion was 460 or more. In comparison with the comparative example of No. 1, it could be seen that in the press-formed article 100 according to the present invention (the invention example of No. 2), the martensite fraction and the Vickers hardness MHv in the protrusion portion were improved. In addition, the ratio (MHv/WHv) of the Vickers hardness MHv in the protrusion portion to the Vickers hardness WHv in the standing wall portion was 1.01 or more. That is, in the press-formed article 100 according to the present invention (the invention example of No. 2), in comparison with the comparative example of No. 1, it could be seen that the ratio of the Vickers hardness in the protrusion portion to the Vickers hardness in the standing wall portion could be improved, and the Vickers hardness in the protrusion portion was could be made equal almost equal to the Vickers hardness in the standing wall portion.

While the embodiments and modification examples of the present invention have been described above, these have been presented by way of example only, and are not intended to limit the scope of the inventions. These embodiments and modification examples can be embodied in a variety of other forms; furthermore, various omissions, substitutions, and changes can be made without departing from the spirit of the inventions. The inventions described in the accompanying claims and their equivalents are intended to cover the embodiments and modification examples as would fall within the scope and spirit of the inventions.

Figure 16A:
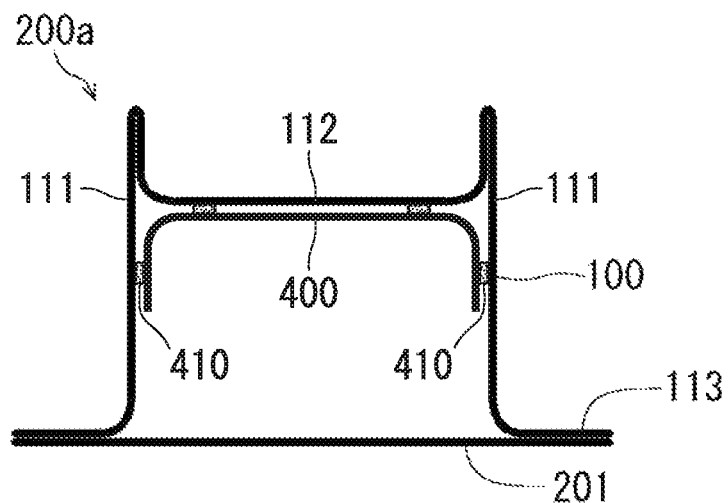
FIG. 16A is a transverse section showing a third modification example of the vehicle member.

For example, as shown in FIG. 16A, a vehicle member 200a may be provided with a patch member 400 joined to the top sheet portion 112 and the standing wall portions 111 of the press-formed article 100 by welding or the like. That is, the vehicle member 200a may be provided with the press-formed article 100, the back sheet 201 joined to the flange portions 113 of the press-formed article 100, and the patch member 400 joined to the inner surface of the top sheet portion 112 and the inner surfaces of the standing wall portions 111 of the press-formed article 100 via joint portions 410. The patch member 400 is, for example, a metal sheet having a U-shaped cross section. A resin may be used as the patch member 400.

By joining the patch member 400 to the press-formed article 100, falling of the standing wall portions 111 can be further suppressed when three-point bending deformation occurs, so that the characteristics in the three-point bending test (the amount of absorbed energy due to three-point bending deformation) can be further improved.

Figure 16B:
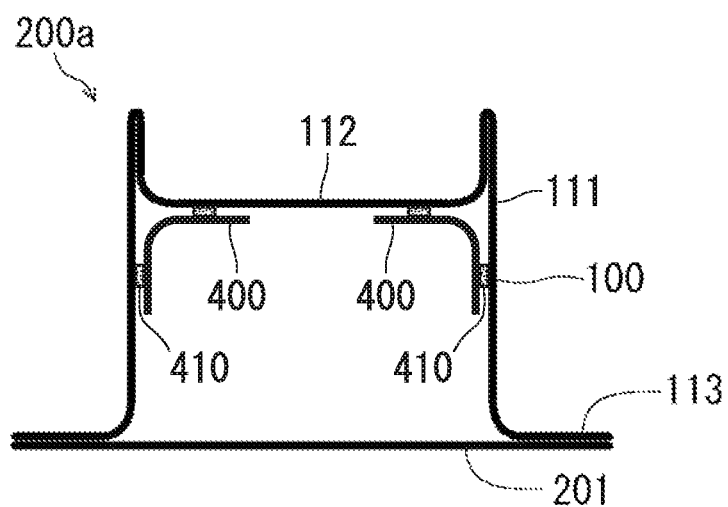
FIG. 16B is a transverse section showing a fourth modification example of the vehicle member.

Furthermore, for example, as shown in FIG. 16B, the patch member 400 divided into two may be joined to the press-formed article 100. In this case, the weight of the patch member 400 can be reduced.

Figure 17A:
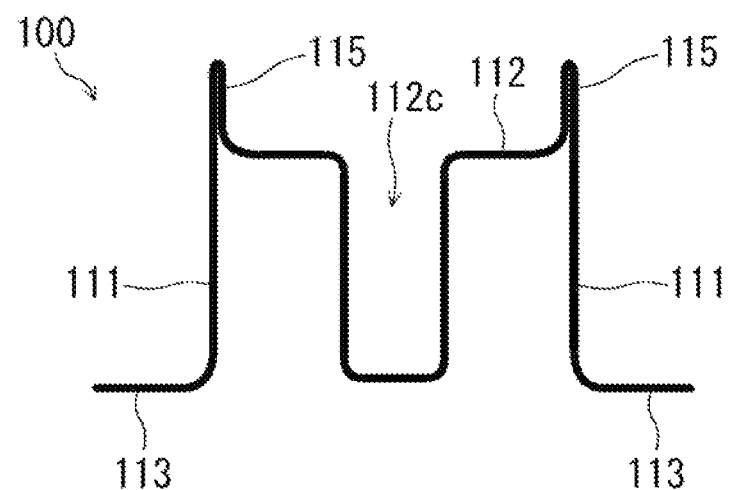
FIG. 17A is a transverse sectional view showing a fifth modification example of the press-formed article.
Figure 17B:
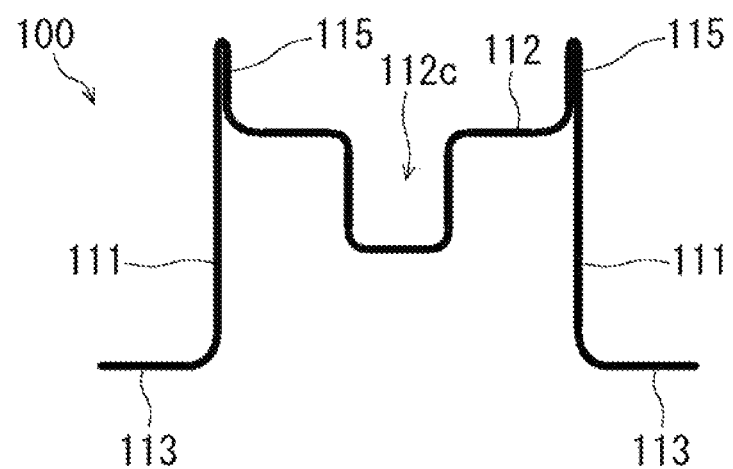
FIG. 17B is a transverse sectional view showing a sixth modification example of the press-formed article.

Furthermore, for example, as shown in FIGS. 17A and 17B, a recessed part 112c may be provided in the top sheet portion 112 of the press-formed article 100. In addition, in the press-formed article 100 shown in FIG. 17A, the depth of the recessed part 112c is substantially the same as the height of the standing wall portion 111.

Here, as in the press-formed article 100 shown in FIGS. 17A and 17B, in a case where a recessed part is provided in the top sheet portion 112, regarding the angles X and Y (see FIG. 2), the angle of the top sheet portion may be determined using a portion excluding the recessed part as the top sheet portion.

In the manufacturing method of a press-formed article according to the second embodiment, a case where pressing by the pair of movable dies 51 and the protrusion 61 is completed after pressing by the punch die 50 and the protrusion 61 is completed. However, the pressing operations may be simultaneously completed, or any of the pressing operations may be started first.

INDUSTRIAL APPLICABILITY

According to the present invention, it is possible to provide a press-formed article having high tensile strength and improved characteristics in a three-point bending test, a vehicle member, and a manufacturing method of a press-formed article.

BRIEF DESCRIPTION OF THE REFERENCE SYMBOLS

10: pressing apparatus
11: lower die
12: base portion
100: press-formed article (hot-stamping formed article)
101: steel sheet
111: standing wall portion
112: top sheet portion
113: flange portion
114: boundary portion
115: protrusion portion
115d: overlapping portion
200a, 200b, 200c: vehicle structural member (vehicle member)
201: back sheet (steel sheet member)
301: preliminary formed article (deformed steel sheet)
301at: top sheet portion equivalent portion
301aw: standing wall portion equivalent portion
301ae: protrusion portion equivalent portion
310: deformed steel sheet
D: protruding length of protrusion portion
X: angle between top sheet portion and protrusion portion

The invention claimed is:

1. A hot-stamping formed article formed of a single high tensile strength steel sheet, comprising: a top sheet portion; a pair of standing wall portions; and a protrusion portion which connects the top sheet portion to one of the pair of standing wall portions and protrudes outward from the top sheet portion, wherein the protrusion portion includes an innerwall portion which stands upright from the top sheet portion, and an outer wall portion which is folded outward from an end edge of the innerwall portion and overlaps the innerwall portion, and an angle between the top sheet portion and the protrusion portion is 80° to 90°, and a martensite fraction of at least the protrusion portion is 90% or more, and wherein the innerwall portion and the outer wall portion of the protrusion portion abut each other.

2. The hot-stamping formed article according to claim 1, wherein the inner wall portion and the outer wall portion of the protrusion portion are joined to each other.

3. The hot-stamping formed article according to claim 1, wherein a protruding length of the protrusion portion is 3 mm or more.

4. The hot-stamping formed article according to claim 1, further comprising:
a pair of flange portions which are connected to end portions of the pair of standing wall portions and extend so as to be separated from each other.

5. The hot-stamping formed article according to claim 1, wherein the single high tensile strength steel sheet has a tensile strength of 780 MPa or more.

6. A vehicle member comprising:
the hot-stamping formed article according to claim 1; and
a steel sheet member which is joined to the hot-stamping formed article so as to form a closed cross section with the hot-stamping formed article.

7. The vehicle member according to claim 6, further comprising:
a patch member joined to at least one of an inner surface of the top sheet portion and an inner surface of at least one of the pair of standing wall portions.

8. A manufacturing method of the hot-stamping formed article formed of a single sheet comprising:
a top sheet portion;
a pair of standing wall portions; and
a protrusion portion which connects the top sheet portion to one of the pair of standing wall portions and protrudes outward from the top sheet portion,
wherein the protrusion portion includes
an inner wall portion which stands upright from the top sheet portion, and
an outer wall portion which is folded outward from an end edge of the inner wall portion, and
an angle between the top sheet portion and the protrusion portion is 80° to 90°, the manufacturing method comprising:
a preparation step of obtaining a preliminary formed article, in which a recessed part is formed, by pressing a base steel sheet;
a heating step of heating the preliminary formed article; and
a press-forming step of forming the preliminary formed article into the hot-stamping formed article by performing press working on the heated preliminary formed article,
wherein, in the press-forming step, a pressing apparatus including a lower die having a protrusion, an upper die which has a punch portion that presses the preliminary formed article and is movable in a vertical direction toward the lower die, and a pair of slide dies which cause the protrusion of the lower die to be interposed between the slide dies and are movable in a horizontal direction toward side surfaces of the protrusion of the lower die is used,
the preliminary formed article is placed in the pressing apparatus so as to cause the protrusion of the lower die to protrude in the recessed part of the preliminary formed article and the preliminary formed article is not to be brought into contact with the protrusion of the lower die, the punch portion, and the pair of slide dies, and
the preliminary formed article is pressed by moving the punch portion and the pair of slide dies.

9. The manufacturing method of the hot-stamping formed article according to claim 8,
wherein the upper die of the pressing apparatus further includes slide pressing dies which are disposed to face the slide dies and press the slide dies, and
in the press-forming step, by moving the slide pressing dies toward the lower die, the slide dies come into sliding contact with the slide pressing dies, and the preliminary formed article is pressed.

10. The manufacturing method of the hot-stamping formed article according to claim 8,
wherein pressing by the slide dies is completed after pressing by the punch portion is completed.

11. A manufacturing method of the hot-stamping formed article formed of a single steel sheet, comprising:
a top sheet portion;
a pair of standing wall portions;
a protrusion portion which connects the top sheet portion to one of the pair of standing wall portions and protrudes outward from the top sheet portion; and
a pair of flange portions which are connected to end portions of the pair of standing wall portions and extend so as to be separated from each other,
wherein the protrusion portion includes
an inner wall portion which stands upright from the top sheet portion, and
an outer wall portion which is folded outward from an end edge of the inner wall portion, and
an angle between the top sheet portion and the protrusion portion is 80° to 90°, the hot-stamping formed article being manufactured by using a pressing apparatus including a lower die having a protrusion and a pair of movable plates that cause the protrusion to be interposed between the movable plates and are movable in a vertical direction, a punch die which is movable in the vertical direction toward the protrusion, and a pair of movable dies which cause the punch die to be interposed between the movable dies and are movable toward the movable plates and the protrusion, the manufacturing method comprising:
a step of heating a base steel sheet;
a step of placing the heated base steel sheet on the pair of movable plates so as not to be brought into contact with the protrusion;
a step of forming the base steel sheet into a deformed steel sheet having a recessed part by lowering the pair of movable dies while abutting the base steel sheet;
a step of pressing the deformed steel sheet by moving the punch die toward the protrusion; and
a step of pressing the deformed steel sheet by moving the pair of movable dies toward the punch die.

* * * * *